(12) United States Patent
Feltrin et al.

(10) Patent No.: US 12,114,361 B2
(45) Date of Patent: Oct. 8, 2024

(54) MEASURED NARROWBANDS FOR MSG3-BASED REPORTING

(71) Applicant: Telefonaktiebolaget LM Ericsson (publ), Stockholm (SE)

(72) Inventors: Luca Feltrin, Solna (SE); Dung Pham Van, Upplands Väsby (SE); Kazuyoshi Uesaka, Kawasaki (JP); Johan Bergman, Stockholm (SE); Ritesh Shreevastav, Upplands Väsby (SE); Santhan Thangarasa, Vällingby (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 438 days.

(21) Appl. No.: 17/426,485

(22) PCT Filed: Jan. 27, 2020

(86) PCT No.: PCT/SE2020/050061
§ 371 (c)(1),
(2) Date: Jul. 28, 2021

(87) PCT Pub. No.: WO2020/159420
PCT Pub. Date: Aug. 6, 2020

(65) Prior Publication Data
US 2022/0117000 A1    Apr. 14, 2022

Related U.S. Application Data

(60) Provisional application No. 62/797,602, filed on Jan. 28, 2019.

(51) Int. Cl.
*H04W 74/0833* (2024.01)
*H04W 24/10* (2009.01)

(52) U.S. Cl.
CPC ....... *H04W 74/0833* (2013.01); *H04W 24/10* (2013.01)

(58) Field of Classification Search
None
See application file for complete search history.

(56) References Cited

U.S. PATENT DOCUMENTS

2015/0016312 A1*  1/2015  Li ...................... H04W 74/006
                                                         370/280
2016/0127936 A1*  5/2016  Chatterjee ............ H04B 7/0632
                                                         370/252

(Continued)

FOREIGN PATENT DOCUMENTS

WO    2017029067 A1    2/2017
WO    2017030345 A1    2/2017

OTHER PUBLICATIONS

Author Unknown, "3rd Generation Partnership Project; Technical Specification Group Radio Access Network; Evolved Universal Terrestrial Radio Access (E-UTRA); Requirements for support of radio resource management (Release 15)," 3GPP TS 36.133 V15.4.0, Sep. 2018, 3227 pages.

(Continued)

*Primary Examiner* — The Hy Nguyen
(74) *Attorney, Agent, or Firm* — Weisberg I.P. Law, P.A.

(57) ABSTRACT

Systems and methods for narrowband measurements and reporting in a cellular communications system are disclosed. Embodiments of a method performed by a wireless device are disclosed. In some embodiments, the method performed by the wireless device comprises determining a set of narrowbands on which to perform measurements, wherein the set of narrowbands on which to perform measurements is a subset of all narrowbands within a respective system bandwidth. The method further comprises performing measurements on the set of narrowbands during one or more (Continued)

time periods associated with a random access procedure, and reporting the measurements or information derived from the measurements to a base station within a message sent from the wireless device to the base station during the random access procedure. In some embodiments, the message sent from the wireless device to the base station during the random access procedure is a Msg3.

12 Claims, 13 Drawing Sheets

(56) References Cited

U.S. PATENT DOCUMENTS

| | | | |
|---|---|---|---|
| 2018/0069612 A1* | 3/2018 | Yum | H04L 5/0091 |
| 2018/0213428 A1* | 7/2018 | Wong | H04L 1/20 |
| 2020/0383119 A1* | 12/2020 | Sun | H04L 5/0053 |
| 2021/0058975 A1* | 2/2021 | Zhao | H04W 74/08 |

OTHER PUBLICATIONS

Author Unknown, "3rd Generation Partnership Project; Technical Specification Group Radio Access Network; Evolved Universal Terrestrial Radio Access (E-UTRA); Physical channels and modulation (Release 15)," 3GPP TS 36.211 V15.3.0, Sep. 2018, 237 pages.
Author Unknown, 3rd Generation Partnership Project; Technical Specification Group Radio Access Network; Evolved Universal Terrestrial Radio Access (E-UTRA); Physical layer procedures (Release 15), 3GPP TS 36.213 V15.4.0, Dec. 2018, 3GPP Organizational Partners, 550 pages.
Author Unknown, "3rd Generation Partnership Project; Technical Specification Group Radio Access Network; Evolved Universal Terrestrial Radio Access (E-UTRA); Medium Access Control (MAC) protocol specification (Release 15)," 3GPP TS 36.321 V15.0.0, Dec. 2017, 3GPP Organizational Partners, 109 pages.
Document Rapporteur (Blackberry), "R2-1818633: RAN2 agreements for Rel-16 additional enhancements for NB-IoT and MTC," 3GPP TSG-RAN WG2 Meeting #104, Nov. 12-16, 2018, Spokane, USA, 7 pages.
Ericsson, "Tdoc R1-1812123: Support of quality report in Msg3 in LTE-MTC," 3GPP TSG-RAN WG1 Meeting #95, Nov. 12-16, 2018, Spokane, USA, 7 pages.
Huawei et al., "R2-1900451: Summary of email discussion [104#50][eMTC R16] Quality report in Msg3," 3GPP TSG-RAN WG2 Meeting #105, Feb. 25-Mar. 1, 2019, Athens, Greece, 13 pages.
Samsung, "R1-1812942: Discussion on Quality report in Msg3 for MTC," 3GPP TSG RAN WG1 Meeting #95, Nov. 12-16, 2018, Spokane, US, 5 pages.
Samsung, "R1-1813741: Feature summary of 6.2.1.2 Support of quality report in Msg3," 3GPP TSG RAN WG1 Meeting #95, Nov. 12-16, 2018, Spokane, US, 12 pages.
International Search Report and Written Opinion for International Patent Application No. PCT/SE2020/050061, mailed Sep. 25, 2020, 22 pages.
Replacement Written Opinion for International Patent Application No. PCT/SE2020/050061, mailed Oct. 5, 2020, 17 pages.

* cited by examiner

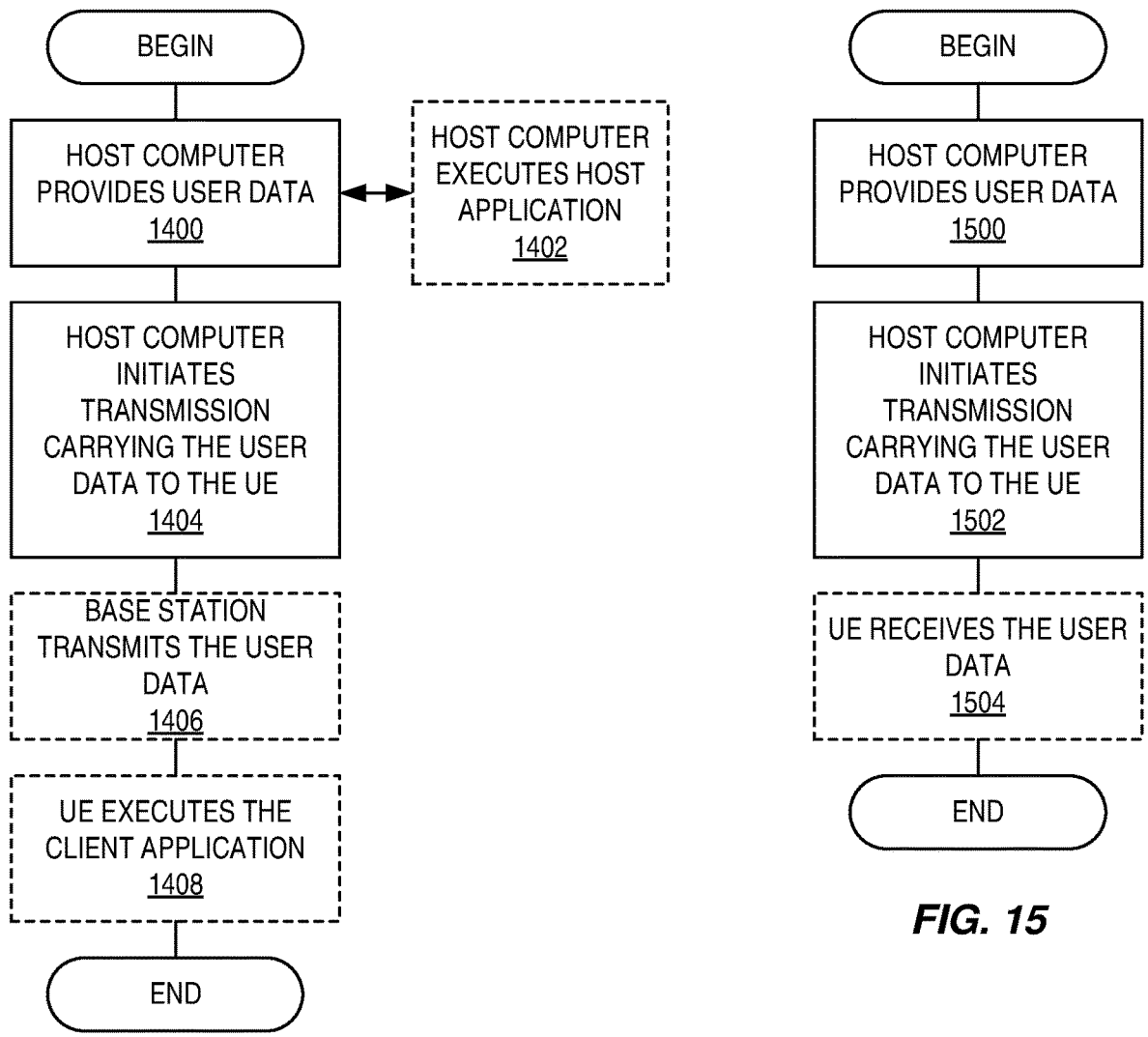

MEASURED NARROWBANDS FOR MSG3-BASED REPORTING

RELATED APPLICATIONS

This application is a 35 U.S.C. § 371 national phase filing of International Application No. PCT/SE2020/050061, filed Jan. 27, 2020, which claims the benefit of provisional patent application Ser. No. 62/797,602, filed Jan. 28, 2019, the disclosures of which are hereby incorporated herein by reference in their entireties.

TECHNICAL FIELD

The present disclosure relates to narrowband measurements in a cellular communications system.

BACKGROUND

In the Third Generation Partnership Project (3GPP) Release (Rel) 16 Work Item Description (WID) on "Additional MTC enhancements for LTE," the following objectives are listed as improvements of downlink (DL) transmission efficiency and/or User Equipment (UE) power consumption [1]:
- specify support for Mobile-Terminated (MT) Early Data Transmission (EDT) [RAN2, RAN3],
- specify quality report in Message 3 (Msg3) at least for EDT [RAN1, RAN2], and
- specify Machine Type Communication (MTC) Physical Downlink Control Channel (MPDCCH) performance improvement by using Cell-Specific Reference Signal (CRS) at least for connected mode [RAN1, RAN2, RAN4].

To improve the DL transmission efficiency and/or UE power consumption, one of the objectives is to specify a quality report in Msg3 of the Random Access (RA) procedure.

For Narrowband Internet of Things (NB-IoT), measurements that can be performed are defined as being during time intervals T1 and T2. T1 corresponds to the time interval when the UE performs Coverage Enhancement (CE) estimation, while T2 corresponds to the time, at the UE, from the beginning of Random Access Response (RAR) reception until the beginning of Msg3 transmission. T1 and T2 are depicted in FIG. 1. In particular, FIG. 1 illustrates definitions of T1 and T2 according to [2] for Long Term Evolution (LTE) MTC (LTE-M) and of T3, as used herein.

The outcome of the measurements is a representation of the number of repetitions to be used for NB-IoT Physical Downlink Control Channel (NPDCCH) encoded as four bits. It is possible to report "noMeasurement" to indicate the absence of useful data for legacy UEs and UEs without the reporting functionality. In this regard, the Radio Resource Control (RRC) message in Msg3 was extended to include these four additional bits. Normally, for NB-IoT UEs, the Msg3 Medium Access Control (MAC) Protocol Data Unit (PDU) is built upon reception of the uplink (UL) grant in the RAR or Message 2 (Msg2) during the RA procedure, i.e. after the RRC layer built the RRC message to be included in Msg3. Modifying the content of this RRC message after T2 requires interaction between MAC and RRC layers, as captured in the specification with a note in [3].

In RAN1 #94, RAN1 #94bis, RAN1 #95, RAN2 #103bis, and RAN2 #104, the following relevant agreements were made [1]:
- channel quality report in Msg3 is introduced for non-EDT, DL quality report is transmitted via higher layer signaling, e.g. MAC control element or RRC message,
- for CE mode A (Physical Random Access Channel (PRACH) CE level 0, 1) and CE mode B, the DL channel quality is the repetition number and/or aggregation level that the UE needs to decode hypothetical MPDCCH with Block Error Rate (BLER) of 1%, and
- enabling of DL quality report is indicated in System Information Block (SIB).

In 3GPP, a "narrowband" is defined as six non-overlapping consecutive Physical Resource Blocks (PRBs) in the frequency domain. Narrowbands are introduced in enhanced MTC (eMTC) to support the reduced UE bandwidth. Narrowbands are predefined and contiguous. All narrowbands are of a size of six PRBs. Narrowbands are non-overlapping. The center PRB (in 3, 5, 15 megahertz (MHz)) and the remaining PRBs at the edges are not included. The enhanced or evolved Node B (eNB) may choose to schedule transmissions across narrowbands to attain better coverage and signal quality for all the UEs being served. However, the same UE is not expected to be transmitting or receiving on more than one narrowband or across multiple narrowbands at any given time.

There currently exist certain challenge(s) in relation to narrowband measurements and reporting. A Bandwidth Limited (BL) or CE (BL/CE) UE or a non-BL/CE UE can perform a MPDCCH quality measurement during T1 and/or T2 of the RA procedure. For the eNB to take the most advantage of the reporting, it is better to specify in which narrowband(s) the UE should conduct the measurement. However, such information is transmitted on a Msg2 transmission or later. This leaves insufficient time for performing the desired measurements (i.e., T3 is an insufficient amount of time to perform these measurements). As such, there is a need for a solution to this problem.

SUMMARY

Systems and methods for narrowband measurements and reporting in a cellular communications system are disclosed. Embodiments of a method performed by a wireless device are disclosed. In some embodiments, the method performed by the wireless device comprises determining a set of narrowbands on which to perform measurements, wherein the set of narrowbands on which to perform measurements is a subset of all narrowbands within a respective system bandwidth. The method further comprises performing measurements on the set of narrowbands during one or more time periods associated with a random access procedure, and reporting the measurements or information derived from the measurements to a base station within a message sent from the wireless device to the base station during the random access procedure. In some embodiments, the message sent from the wireless device to the base station during the random access procedure is a Message 3 (Msg3). In this manner, the wireless device is enabled to perform narrowband measurements on only the determined narrowbands, rather than all narrowbands in the respective system bandwidth, even if the narrowband measurements are performed or partially performed prior to receiving Downlink Control Information (DCI) for Msg3.

In some embodiments, the set of narrowbands on which to perform measurements is a subset of all narrowbands on which Msg3 or Message 4 (Msg4) can be scheduled for the wireless device during the random access procedure. The subset is less than all narrowbands on which Msg3 or Msg4 can be scheduled for the wireless device during the random access procedure. In this manner, the wireless device is enabled to perform narrowband measurements on only the determined narrowbands, rather than all narrowbands on which Msg3 or Msg4 can be scheduled for the wireless device during the random access procedure, even if the narrowband measurements are performed or partially performed prior to receiving DCI for Msg3 or Msg4.

In some embodiments, the method further comprises transmitting a random access preamble, receiving DCI for a Random Access Response (RAR), receiving the RAR from the network node in accordance with the DCI for the RAR, and transmitting a Msg3 to the network node. In some embodiments, reporting the measurements or the information derived from the measurements to the base station comprises reporting the measurements or the information derived from the measurements to the base station within the Msg3.

In some embodiments, the set of narrowbands on which to perform measurements comprises one or more narrowbands required for blind decoding of a wireless device specific search space. In some other embodiments, the set of narrowbands on which to perform measurements comprises one or more narrowbands required for blind decoding of a common search space. In some other embodiments, the set of narrowbands on which to perform measurements comprises one or more narrowbands required for blind decoding of a wireless device specific search space and a common search space. In some other embodiments, the set of narrowbands on which to perform measurements comprises one or more narrowbands in which the wireless device is to monitor for paging. In some other embodiments, the set of narrowbands on which to perform measurements comprises: (a) one or more narrowbands required for blind decoding of a wireless device specific search space; (b) one or more narrowbands required for blind decoding of a common search space; (c) both (a) and (b); (d) one or more narrowbands in which the wireless device is to monitor for paging; (e) both (a) and (d); (f) both (b) and (d); or (g) both (c) and (d).

In some embodiments, the method further comprises receiving information comprising one or more possible values for a Message 2 (Msg2) DCI narrowband index and receiving bit vectors of different lengths, the different lengths corresponding to different values for a number of possible narrowbands in which Msg3/4 DCI may be located. The Msg2 DCI narrowband index is an index of a narrowband to be monitored for DCI scheduling a RAR (also referred to as "Msg2") during the random access procedure. Determining the set of narrowbands on which to perform the measurements comprises selecting one of the bit vectors having a length that corresponds to a number of possible narrowbands in which the Msg3/4 DCI may be located for a particular configuration of the wireless device and determining the set of narrowbands on which to perform the measurements as a function of: the selected bit vector, the one or more possible values for the Msg2 DCI narrowband index, and a number of narrowbands within the respective system bandwidth.

In some embodiments, the method further comprises receiving information comprising one or more possible values for a Msg2 DCI narrowband index and receiving bit vectors of different lengths, the different lengths corresponding to different values for a number of possible narrowbands in which Msg3/4 DCI may be located. The Msg2 DCI narrowband index is an index of a narrowband to be monitored for DCI scheduling a RAR during the random access procedure. Determining the set of narrowbands on which to perform the measurements comprises selecting one of the bit vectors having a length that corresponds to a number of possible narrowbands in which the Msg3/4 DCI may be located for a particular configuration of the wireless device, initializing the set of narrowbands as a null set, and, for each possible value $NB_{RAR}^{(j)}$ for the Msg2 DCI narrowband index and for each bit $b_i$ of the selected bit vector, adding the narrowband with index $(NB_{RAR}^{(j)}+i)$ mod $N_{NB2}$ into the set of narrowbands S if $b_i=1$ and if not already present, where $N_{NB2}$ is the number of narrowbands in the system bandwidth.

In some embodiments, performing the measurements on the set of narrowbands comprises performing the measurements on the set of narrowbands during: a first time interval prior to transmission of a random access preamble during the random access procedure, a second time between a start of reception of DCI for a RAR at the wireless device during the random access procedure and transmission of a Msg3 by the wireless device during the random access procedure, or both the first time interval and the second time interval.

In some embodiments, reporting the measurements or the information derived from the measurements to the network node comprises reporting a combination of the measurements. In some embodiments, the combination of the measurements is an average or weighted average of the measurements.

In some embodiments, reporting the measurements or the information derived from the measurements to the network node comprises reporting a combination of the measurements performed on different narrowbands within the set of narrowbands performed during different time intervals. In some embodiments, the combination of the measurements is an average or weighted average of the measurements.

In some embodiments, the method further comprises deriving, based on the measurement, a number of repetitions needed for each narrowband in the set of narrowbands. In some embodiments, the method further comprises reporting the number of repetitions needed for each narrowband in the set of narrowbands to the base station. In some other embodiments, the method further comprises reporting an average of the number of repetitions needed for each narrowband in the set of narrowbands to the base station.

In some embodiments, the wireless device is a bandwidth limited or coverage enhanced User Equipment (UE).

In some embodiments, the wireless device is a Machine Type Communication (MTC) UE.

In some embodiments, the wireless device is only required to monitor one narrowband, rather than the entire system bandwidth.

Corresponding embodiments of a wireless device are also disclosed. In some embodiments, a wireless device is adapted to determine a set of narrowbands on which to perform measurements, wherein the set of narrowbands on which to perform measurements is a subset of all narrowbands within a respective system bandwidth. The wireless device is further adapted to perform measurements on the set of narrowbands during one or more time periods associated with a random access procedure and report the measurements or information derived from the measurements to a base station within a message sent from the wireless device to the base station during the random access procedure. In some embodiments, the wireless device comprises one or more transmitters, one or more receivers, and processing circuitry associated with the one or more transmitters and the one or more receivers, wherein the processing circuitry is configured to cause the wireless device to determine the set of narrowbands on which to perform measurements, perform the measurements on the set of narrowbands, and report the measurements or the information derived from the measurements to the base station.

In some other embodiments, a method performed by a wireless device comprises performing measurements on different narrowbands within a respective system bandwidth during different time intervals, combining at least some of the measurements to provide a combined measurement, and reporting the combined measurement to a network node.

In some embodiments, reporting the combined measurement comprises reporting the combined measurement as part of a Msg3 transmission during a random access procedure.

In some embodiments, performing the measurements comprises performing measurements on a first set of narrowbands during a first time interval and performing measurements on a second set of narrowbands during a second time interval, wherein the second set of narrowbands is different than the first set of narrowbands and the second time interval is subsequent to the first time interval. In some embodiments, the first time interval is a time interval prior to transmission of a random access preamble by the wireless device during a random access procedure. In some embodiments, the second time interval is a time interval between a start of reception of DCI for a RAR during the random access procedure and transmission of a Msg3 during the random access procedure. In some embodiments, reporting the combined measurement comprises reporting the combined measurement as part of a Msg3 transmission during a random access procedure.

In some embodiments, combining the at least some of the measurements comprises computing an average or weighted average of the at least some of the measurements.

In some embodiments, the method further comprises providing an indication to the network node that the combined measurement is a combined measurement.

In some embodiments, the method further comprises providing, to the network node, information that indicates one or more parameters utilized by the wireless device to combine the at least some of the measurements.

Embodiments of a method performed by a base station are also disclosed. In some embodiments, the method performed by the base station comprises determining a set of narrowbands to which to constrain transmission of Msg3/4 DCI to a particular wireless device during a random access procedure, wherein the set of narrowbands is a subset of all narrowbands within a respective system bandwidth. The method further comprises scheduling Msg3/4 DCI for transmission to the wireless device during the random access procedure, in accordance with a constraint on transmission of the Msg3/4 DCI to the set of narrowbands, and transmitting the Msg3/4 DCI as scheduled.

In some embodiments, the method further comprises receiving, from the particular wireless device during the random access procedure, a Msg3 comprising a report of measurements on the set of narrowbands or information derived from the measurements on the set of narrowbands.

In some embodiments, the method further comprises transmitting information comprising one or more possible values for a Msg2 DCI narrowband index and transmitting bit vectors of different lengths, wherein the different lengths correspond to different values for a number of possible narrowbands in which the Msg3/4 DCI may be located. Determining the set of narrowbands comprises selecting one of the bit vectors having a length that corresponds to a number of possible narrowbands in which the Msg3/4 DCI may be located for a particular configuration of the wireless device and determining the set of narrowbands as a function of: the selected bit vector, one of the one or more possible values for the Msg2 DCI narrowband index, and a number of narrowbands within the system bandwidth. In some embodiments, the one of the one or more possible values is either only one value comprised in the information transmitted by the base station or one of the one or more possible values that corresponds to a narrowband in which the Msg2 DCI is scheduled for transmission to the wireless device.

In some embodiments, the method further comprises transmitting information comprising one or more possible values for a Msg2 DCI narrowband index and transmitting bit vectors of different lengths, wherein the different lengths correspond to different values for a number of possible narrowbands in which the Msg3/4 DCI may be located. Determining the set of narrowbands comprises selecting one of the bit vectors having a length that corresponds to a number of possible narrowbands in which the Msg3/4 DCI may be located for a particular configuration of the wireless device, initializing the set of narrowbands as a null set, and, for each bit $b_i$ of the selected bit vector, adding the narrowband with index $(NB_{RAR}+i) \mod N_{NB2}$ in the set of narrowbands if $b_i=1$, where $N_{NB2}$ is a number of narrowbands in the system bandwidth and $NB_{RAR}$ is one of the one or more possible values for the Msg2 DCI narrowband index. In some embodiments, the one of the one or more possible values is either only one value comprised in the information transmitted by the base station or one of the one or more possible values that corresponds to a narrowband in which the Msg2 DCI is scheduled for transmission to the wireless device.

Corresponding embodiments of a base station are also disclosed. In some embodiments, a base station is adapted to determine a set of narrowbands to which to constrain transmission of Msg3/4 DCI to a particular wireless device during a random access procedure, wherein the set of narrowbands being a subset of all narrowbands within a respective system bandwidth. The base station is further adapted to schedule Msg3/4 DCI for transmission to the wireless device during the random access procedure, in accordance with a constraint on transmission of the Msg3/4 DCI to the set of narrowbands, and transmit the Msg3/4 DCI as scheduled. In some embodiments, the base station comprises processing circuitry configured to cause the base station to determine the set of narrowbands to which to constrain transmission of Msg3/4 DCI to the particular wireless device during the random access procedure, schedule the Msg3/4 DCI for transmission to the wireless device during the random access procedure, in accordance with the constraint on transmission of the Msg3/4 DCI to the set of narrowbands, and transmit the Msg3/4 DCI as scheduled.

In some embodiments, a method performed by a base station comprises receiving, from a wireless device, a combined measurement, wherein the combined measurement is a combination of measurements on different narrowbands within a respective system bandwidth during different time intervals. The method further comprises utilizing the combined measurement.

In some embodiments, receiving the combined measurement comprises receiving the combined measurement as part of a Msg3 transmission during a random access procedure.

In some embodiments, the combination of measurements comprises the combination of measurements on a first set of narrowbands during a first time interval and measurements on a second set of narrowbands during a second time interval, wherein the second set of narrowbands is different than the first set of narrowbands and the second time interval is subsequent to the first time interval. In some embodiments, the first time interval is a time interval prior to transmission of a random access preamble by the wireless device during a random access procedure. In some embodiments, the second time interval is a time interval between a start of reception of DCI for a RAR during the random access procedure and transmission of a Msg3 during the random access procedure. In some embodiments, receiving the combined measurement comprises receiving the combined measurement as part of a Msg3 transmission during a random access procedure.

In some embodiments, the combined measurement is an average or weighted average of the combined measurements.

In some embodiments, the method further comprises receiving an indication from the wireless device that the combined measurement is a combined measurement.

In some embodiments, the method further comprises receiving, from the wireless device, information that indicates one or more parameters utilized by the wireless device to combine the measurements.

Corresponding embodiments of a base station are also disclosed. In some embodiments, a base station is adapted to receive, from a wireless device, a combined measurement, wherein the combined measurement is a combination of measurements on different narrowbands within a respective system bandwidth during different time intervals. The base station is further adapted to utilize the combined measurement. In some embodiments, the base station comprises processing circuitry configured to cause the base station to receive the combined measurement from the wireless device and utilize the combined measurement.

BRIEF DESCRIPTION OF THE DRAWINGS

The accompanying drawing figures incorporated in and forming a part of this specification illustrate several aspects of the disclosure, and together with the description serve to explain the principles of the disclosure.

FIGS. 14 through 17 are flowcharts illustrating methods implemented in a communication system in accordance with some embodiments of the present disclosure.

DETAILED DESCRIPTION

Figure 1:
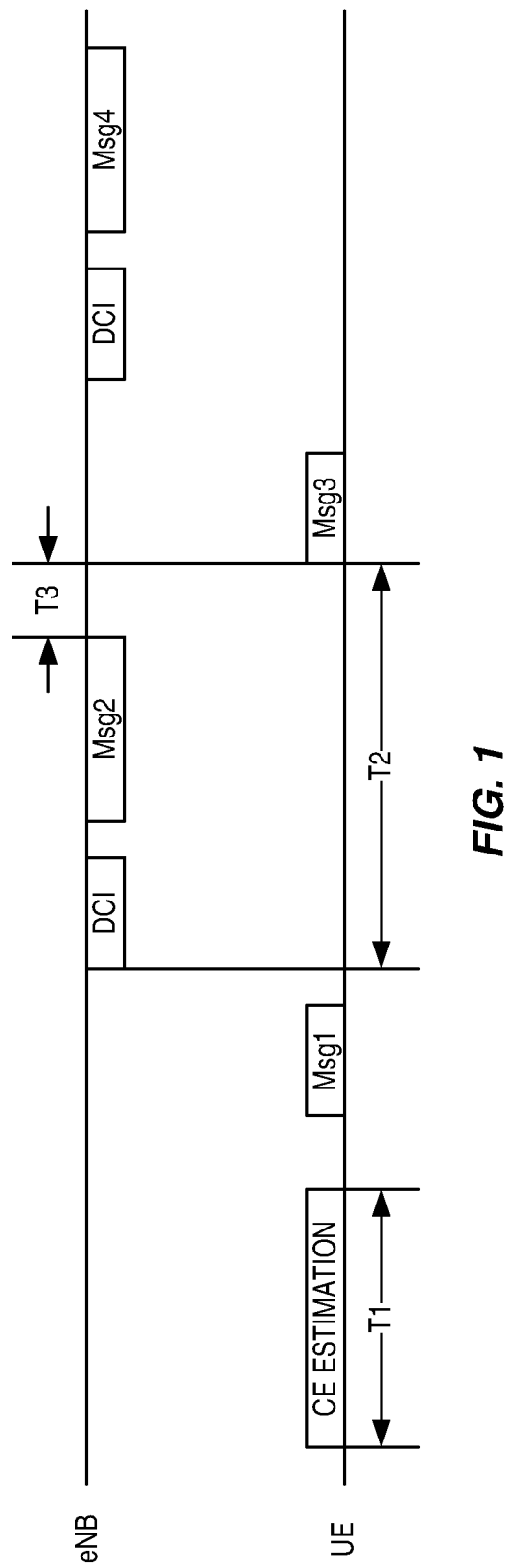
FIG. 1 illustrates definitions of time periods, T1 and T2, during a random access procedure.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Radio Node: As used herein, a "radio node" is either a radio access node or a wireless device.

Radio Access Node: As used herein, a "radio access node" or "radio network node" is any node in a Radio Access Network (RAN) of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), and a relay node.

Core Network Node: As used herein, a "core network node" is any type of node in a core network. Some examples of a core network node include, e.g., a Mobility Management Entity (MME), a Packet Data Network Gateway (P-GW), a Service Capability Exposure Function (SCEF), or the like.

Wireless Device: As used herein, a "wireless device" is any type of device that has access to (i.e., is served by) a cellular communications network by wirelessly transmitting and/or receiving signals to a radio access node(s). Some examples of a wireless device include, but are not limited to, a User Equipment (UE) in a 3GPP network and a Machine Type Communication (MTC) device.

Network Node: As used herein, a "network node" is any node that is either part of the RAN or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell;" however, particularly with respect to 5G NR concepts, beams may be used instead of cells and, as such, it is important to note that the concepts described herein are equally applicable to both cells and beams.

There currently exist certain challenge(s) in relation to narrowband measurements and reporting. A Bandwidth Limited (BL) or Coverage Enhancement (CE) (BL/CE) UE or a non-BL/CE UE can perform a MTC Physical Downlink Control Channel (MPDCCH) quality measurement during T1 and/or T2 (see FIG. 1 for illustration of T1 and T2) of the Random Access (RA) procedure. For the eNB to take the most advantage of the reporting, it is better to specify in which narrowband(s) the UE should conduct the measurement. However, such information is transmitted on a Message 2 (Msg2) transmission or later.

More specifically, the Medium Access Control (MAC) Random Access Response (RAR) transmitted in Msg2 contains the following relevant field (Table 6-2 [4]):

Msg3/4 MPDCCH narrowband index: offset between Message 3 (Msg3)/Message 4 (Msg4) Downlink Control Information (DCI) narrowband and Msg2 DCI narrowband. Note that, after transmitting Msg3, the UE normally expects to receive Msg4 DCI. However, if Msg3 was not received correctly by the eNB, then the eNB will schedule a second Msg3 with a Msg3 DCI instead of a Msg4 DCI. Thus, the DCI that normally schedules Msg4 but that can be used instead to schedule another Msg3 transmission is referred to herein as "Msg3/4 DCI".

Depending on the specific case, the Msg3/4 MPDCCH narrowband index should be interpreted as follows. For the non-Early Data Transmission (EDT) case, CEmodeA and CEmodeB, the Msg3/4 MPDCCH narrowband index is a two bit value, where these two bits are interpreted as defined Table 6.2B [4], which is reproduced below.

TABLE 6.2[4]

| Value of 'Msg3/4 MPDCCH narrowband index' | Msg3/4 MPDCCH Narrowband |
|---|---|
| '00' | $NB_{RAR}$ mod $N_{NB2}$ |
| '01' | $(NB_{RAR} + 1)$ mod $N_{NB2}$ |
| '10' | $(NB_{RAR} + 2)$ mod $N_{NB2}$ |
| '11' | $(NB_{RAR} + 3)$ mod $N_{NB2}$ |

Note that $NB_{RAR}$ is the Msg2 DCI narrowband index (included in the Msg2 DCI) and is one of the up to two possible values specified in the field mpdcch-NarrowbandsToMonitor in System Information Block 2 (SIB2) (denoted as $NB_{RAR}^{(0)}$ and $NB_{RAR}^{(1)}$), and $N_{NB2}$ is the number of downlink (DL) narrowbands available in the carrier, as described in [4]. The Msg2 DCI narrowband index $NB_{RAR}$ is an index of a narrowband to be monitored for DCI scheduling a RAR (also referred to as "Msg2") during the random access procedure.

For the EDT case, CEmodeA, the Msg3/4 MPDCCH narrowband index is $N_{NB}^{index}$ bits, and represents the narrowband index. Note that $N_{NB}^{index} = \log_2(N_{NB2})$, where N is the number of DL narrowbands available in the carrier, as described in [4]. For the EDT case, CEmodeB, the Msg3/4 MPDCCH narrowband index is three bits as in Table 6.2H [4] reproduced below.

TABLE 6.2H [4]

| Value of 'Msg3/4 MPDCCH narrowband index' | Msg3/4 MPDCCH Narrowband |
|---|---|
| '000' | $NB_{RAR}$ mod $N_{NB2}$ |
| '001' | $(NB_{RAR} + 1)$ mod $N_{NB2}$ |
| '010' | $(NB_{RAR} + 2)$ mod $N_{NB2}$ |
| '011' | $(NB_{RAR} + 3)$ mod $N_{NB2}$ |
| '100' | $(NB_{RAR} + 4)$ mod $N_{NB2}$ |
| '101' | $(NB_{RAR} + 5)$ mod $N_{NB2}$ |
| '110' | $(NB_{RAR} + 6)$ mod $N_{NB2}$ |
| '111' | $(NB_{RAR} + 7)$ mod $N_{NB2}$ |

Note that Msg2 DCI narrowband index ($NB_{RAR}$) is either one of the two values specified in the field mpdcch-NarrowbandsToMonitor in SIB2, which are denoted as $NB_{RAR}^{(0)}$ and $NB_{RAR}^{(1)}$. This means that after the UE starts the RA procedure and the RA preamble index becomes available, or before the RA procedure starts if only one narrowband is specified in mpdcch-NarrowbandsToMonitor, there are $N_{NB}$=A possible narrowbands where Msg3/4 DCI could be transmitted, where A=min$\{N_{NB2}, N_{NB}^{choices}\}$ Otherwise there are A≤$N_{NB}$≤min$\{N_{NB2}, 2N_{NB}^{choices}\}$ narrowbands where Msg3/4 DCI could be transmitted, where $N_{NB}^{choices}$=4 for non-EDT, CEmodeA and CEmodeB,
$N_{NB}^{choices}$=8 for EDT, CEmodeB, and
$N_{NB}^{choices}$=$N_{NB2}$ for EDT, CEmodeA.

Note that $N_{NB}$ is a variable used herein in the formulation of a methodology for representing the number of possible narrowbands in which Msg4 DCI may be scheduled. According to [4], $N_{NB2}$ is the number of DL narrowbands available in the carrier. Note that $N_{NB}$ and A depend on the configuration of the UE and whether the UE is performing an EDT or non-EDT access.

If the measurement on the narrowband where Msg3/4 DCI is transmitted must be reported in Msg3, the time left available to perform the measurement is denoted in FIG. 1 as "T3", and it is usually shorter than T2. T3 may not be enough to perform the measurement with a good quality.

To overcome the problem, a possible solution is to perform a measurement on a random narrowband during either T1 or T2, but there is only $1/N_{NB}$ probability for the measurement to refer to the narrowband where MPDCCH for Msg3/4 DCI will be actually transmitted. In the worst case, when $N_{NB}$=16, this probability is only 6.25%.

Another solution is to measure all the narrowbands the UE could in the system, but this would lead to considerable energy consumption and, in general, waste of processing power and resources. Also, if the eNB enables Cell-Specific Reference Signal (CRS) muting, BL/CE UE in idle mode expects CRS on: (1) the center frequency, e.g. center 6 or 24 Physical Resource Blocks (PRBs), (2) the PRBs where MPDCCH/Physical Downlink Shared Channel (PDSCH) is scheduled for paging, System Information (SI), and RAR, and (3) the full system bandwidth with a certain periodicity (e.g., 10 milliseconds (ms), or 20 ms).

Certain aspects of the present disclosure and their embodiments may provide solutions to the aforementioned or other challenges. Systems and methods are described herein that provide a solution(s) that enables the UE to perform a reduced and tunable number of measurements on a subset of the narrowbands available in the system. The eNB and Network (NW) can then take better advantage of the reported information to optimize the subsequent transmissions and to set up the parameters used for the later stage of the communication. Further, measurements performed on different narrowbands during different time occasions can be combined and reported to the NW.

Certain embodiments may provide one or more of the following technical advantage(s). For example, if requested and if the UE can perform the measurement(s), the UE is enabled to perform the measurement on the narrowband where Msg3/4 DCI is transmitted and report the measurement(s) or some information derived from the measurement(s) to the NW, e.g., in Msg3. As another example, some embodiments of the present disclosure enable the UE to report a measurement value(s) that is(are) meaningful for the NW, e.g., to be used in deciding the value mpdcch-NumRepetition-r13 when the UE enters the CONNECTED mode.

Figure 2:
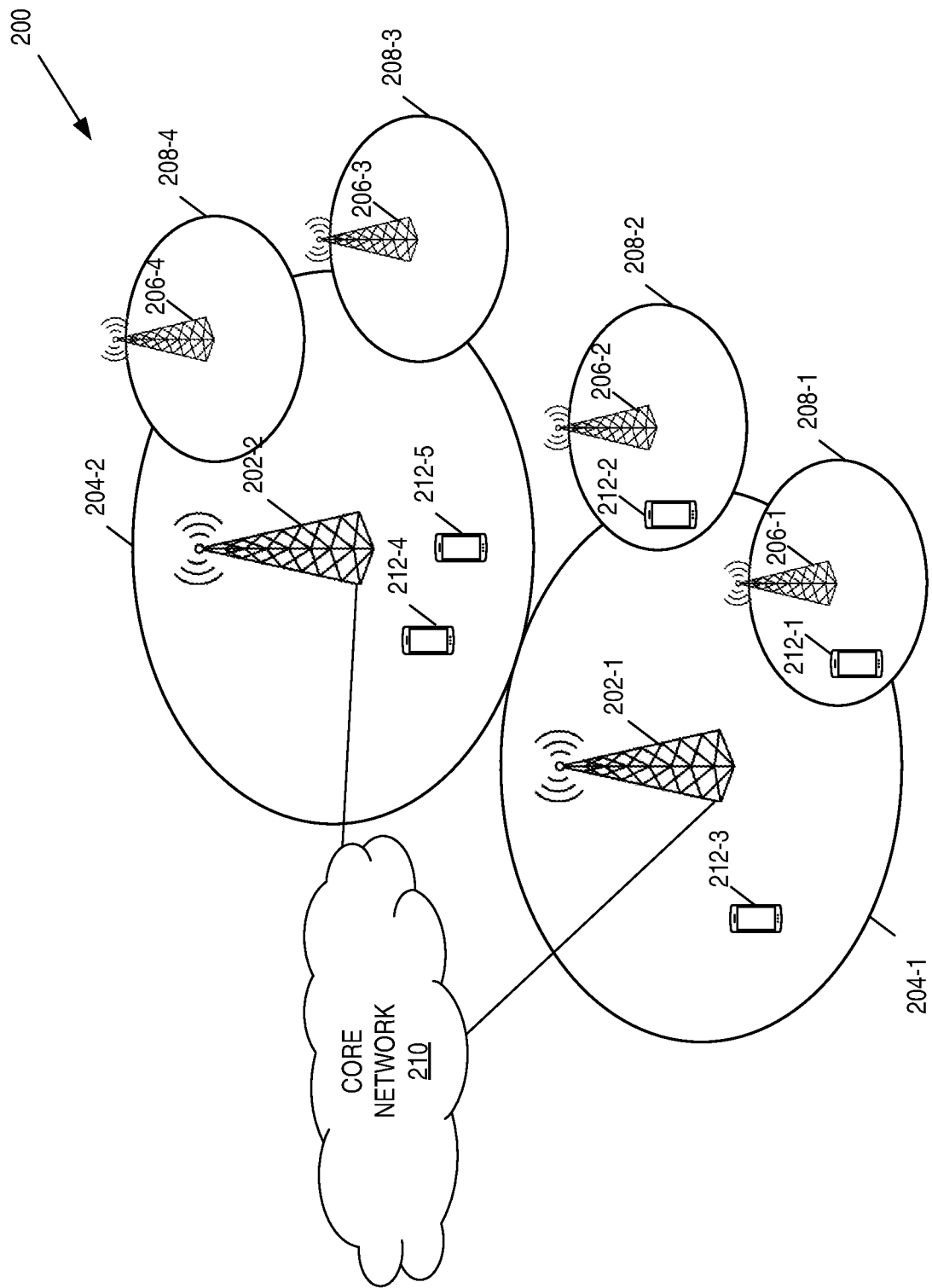
FIG. 2 illustrates one example of a cellular communications system in which embodiments of the present disclosure may be implemented.

FIG. 2 illustrates one example of a cellular communications system 200 in which embodiments of the present disclosure may be implemented. In the embodiments described herein, the cellular communications system 200 is an LTE system (i.e., an Evolved Packet System (EPS) including an Evolved Packet Core (EPC) and an LTE RAN, which is also referred to as an Evolved Universal Terrestrial Radio Access Network (E-UTRAN)) or NR system (i.e., a 5G System (5GS) including a 5G Core (5GC) and a Next Generation RAN (NG-RAN), which is also referred to herein as a NR RAN). In this example, the cellular communications system 200 includes base stations 202-1 and 202-2, which in LTE are referred to as eNBs and in 5G NR are referred to as gNBs or ng-eNBs (i.e., LTE RAN nodes connected to the 5GC), controlling corresponding macro cells 204-1 and 204-2. The base stations 202-1 and 202-2 are generally referred to herein collectively as base stations 202 and individually as base station 202. Likewise, the macro cells 204-1 and 204-2 are generally referred to herein collectively as macro cells 204 and individually as macro cell 204. The cellular communications system 200 may also include a number of low power nodes 206-1 through 206-4 controlling corresponding small cells 208-1 through 208-4. The low power nodes 206-1 through 206-4 can be small base stations (such as pico or femto base stations) or Remote Radio Heads (RRHs), or the like. Notably, while not illustrated, one or more of the small cells 208-1 through 208-4 may alternatively be provided by the base stations 202. The low power nodes 206-1 through 206-4 are generally referred to herein collectively as low power nodes 206 and individually as low power node 206. Likewise, the small cells 208-1 through 208-4 are generally referred to herein collectively as small cells 208 and individually as small cell 208. The base stations 202 (and optionally the low power nodes 206) are connected to a core network 210.

The base stations 202 and the low power nodes 206 provide service to wireless devices 212-1 through 212-5 in the corresponding cells 204 and 208. The wireless devices 212-1 through 212-5 are generally referred to herein collectively as wireless devices 212 and individually as wireless device 212. The wireless devices 212 are also sometimes referred to herein as UEs.

In some embodiments, a UE (e.g., wireless device 212) determines a subset of a set of narrowbands in which the network can expect the UE to perform a measurement(s) and report the measurement(s), or some information derived therefrom, to the network. The set of narrowbands from which the subset is determined is the set of all possible narrowbands in which, during random access, Msg3/4 DCI could be transmitted. The determined subset includes one or more of the narrowbands from this set, but preferably less than all of the narrowbands in this set. Once the subset is determined, the UE performs the measurement(s) on the narrowband(s) in the determined subset and reports the measurement(s) or information derived from the measurement(s) to the network.

More specifically, in some embodiments, there is a set of A narrowbands in which Msg3/4 DCI could be transmitted to the UE during a random access procedure. The UE determines a subset of the set of A narrowbands, where the network (e.g., base station 202) can expect the UE to perform measurement(s) on the narrowbands in the determined subset and report the measurement(s) or some information derived therefrom to the network.

In some embodiments, since in the same cell all of the cases mentioned above can co-exist (e.g., non-EDT with CE mode A or CE mode B, EDT with CE mode A, and/or EDT with CE mode B), four vectors of bits (i.e., bit array) with the length of 2, 4, 8, and 16 bits, respectively, are defined. In other words, different bit vectors are defined for the different possible values of A. One or more of these bit vectors are provided from the network (e.g., from the base station 202) to the UEs (e.g., the wireless devices 212), e.g., via system information (e.g., SIB) or otherwise. Each UE considers only the bit vector of bits with a length that corresponds to the value of A for the UE's particular configuration (e.g., the UE's configuration of EDT or non-EDT, CE mode A or CE mode B, and the configured number of narrowbands $N_{NB2}$ present in the carrier). For example, if the (e.g., DL) system bandwidth is 10 megahertz (MHz), the number of configured narrowbands is eight. If the UE is performing a non-EDT operation, the network and/or the UE assume the length of the bit vector is 4. As another example, if the system bandwidth is 3 MHz, the number of configured narrowbands is two and, therefore, the length of the vector considered by the network and/or UE is the vector of length 2 because, regardless of the type of operation and CE mode, at most only two narrowbands can be selected. Note that the configuration about the number of narrowbands in the carrier is performed in broadcast SI, e.g., SIB2.

When A=1, the only narrowband present in the carrier should always be measured if the feature is enabled.

One example of a process performed by the UE to determine the set of narrowbands to measure (S) is as follows:

S=Ø
For each value ($NB_{RAR}^{(j)}$) in mpdcch-NarrowbandsToMonitor
    For each bit $b_i$ of the bit vector (i∈[0, $N_{NB}$−1])
        If $b_i$==1
            Narrowband with index ($NB_{RAR}^{(j)}$) mod $N_{NB2}$ is included in S if not already present Here, the "bit vector" is the bit vector with a length that corresponds to value of A for the UE's particular configuration (e.g., the UE's configuration of EDT or non-EDT, CE mode A or CE mode B, and the configured number of narrowbands $N_{NB2}$ present in the carrier), as described above.

Although the total number of measurements is not described in a mathematical form, it depends mainly on the number of "1"s indicated in the corresponding bit vector. Therefore, it is possible for the network (e.g., the base station 202) to adjust the amount of measurements by tuning jointly mpdcch-NarrowbandsToMonitor and the number of "1"s in the bit vector(s).

From a UE perspective, the set of narrowbands to measure becomes known after SIB2 reception. Normally, this means that the UE has the information to perform the measurement during T1 (see FIG. 1).

From the network (e.g., the base station 202) perspective, if two narrowbands are specified in mpdcch-NarrowbandsToMonitor, the set of narrowbands in which a specific Msg3/4 MPDCCH should be scheduled becomes known after Message 1 (Msg1) reception, when it is possible to calculate the RA preamble index and therefore which one of the two narrowbands for Msg2 DCI transmission is valid. If only one narrowband is specified in mpdcch-NarrowbandsToMonitor, then the set of narrowbands in which Msg3/4 MPDCCH should be scheduled is static and known in advance.

One example of a process performed by the network (e.g., the base station 202) to determine the set of narrowbands in which the network can schedule Msg3/4 DCI (V) is as follows. Here, $NB_{RAR}$ is either the only value present in mpdcch-NarrowbandsToMonitor or the narrowband in which Msg2 DCI is scheduled after preamble reception.

V=Ø
For each bit $b_i$ of the bit vector (i∈[0, $N_{NB}$−1])
    If $b_i$==1
        Narrowband with index ($NB_{RAR}$+i) mod $N_{NR2}$ is included in V Again, here, the "bit vector" is the bit vector with a length that corresponds to value of A for the UE's particular configuration (e.g., the UE's configuration of EDT or non-EDT, CE mode A or CE mode B, and the configured number of narrowbands $N_{NB2}$ present in the carrier), as described above.

Figure 3:
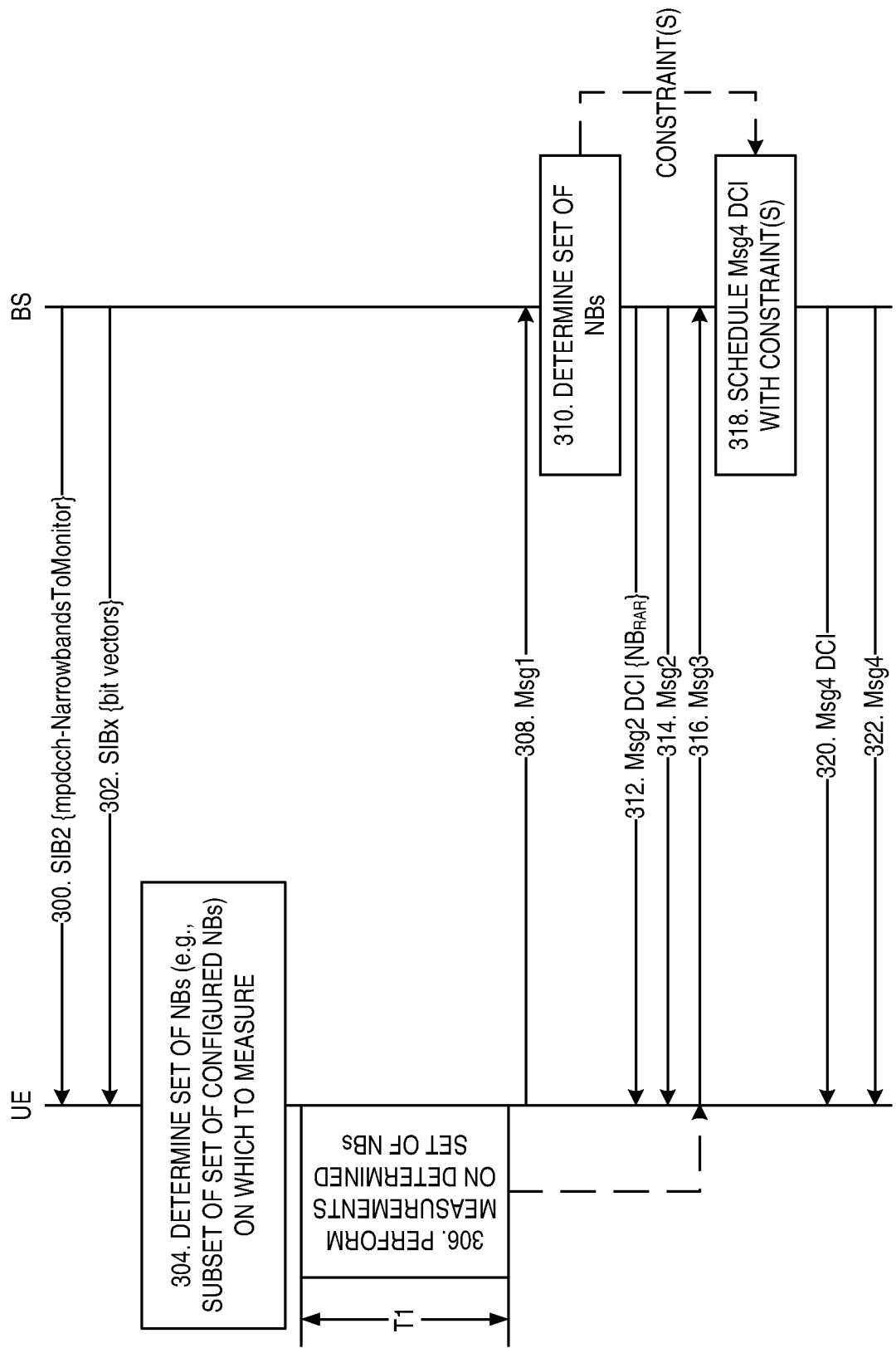
FIGS. 3 and 4 are call flow diagrams that illustrate the operation of a User Equipment (UE) and a base station to enable measurements and measurement reporting by the UE during a random access procedure in accordance with some embodiments of the present disclosure.
Figure 4:
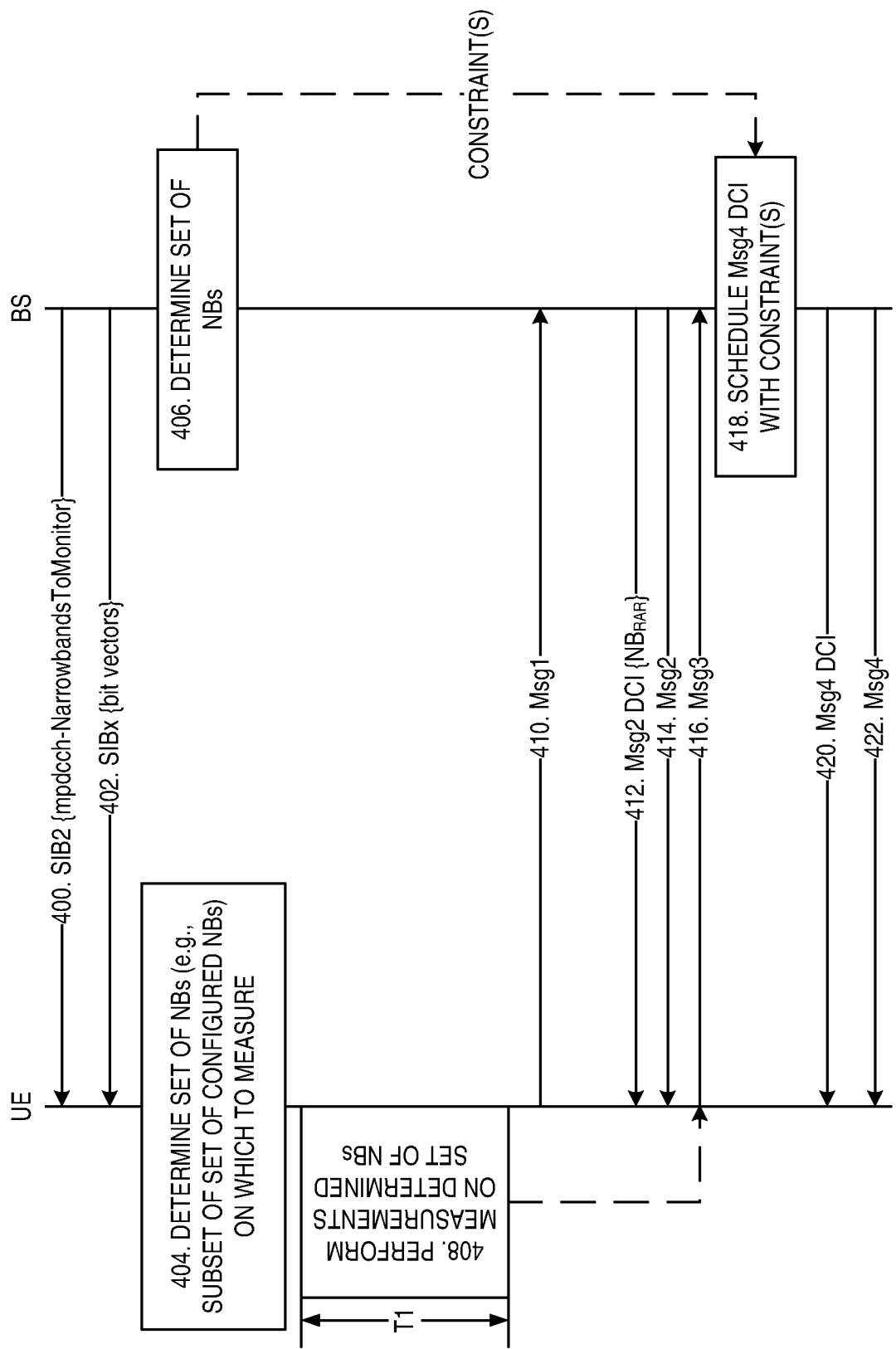

FIGS. 3 and 4 are call flow diagrams that illustrate the operation of a UE (e.g., wireless device 212) and a base station (e.g., base station 202 such as an eNB or gNB) to enable measurements and measurement reporting by the UE during a random access procedure in accordance with some embodiments of the present disclosure. FIG. 3 illustrates a process when mpdcch-NarrowbandsToMonitor has two elements, whereas FIG. 4 illustrates a process when mpdcch-NarrowbandsToMonitor has only one element. Note that the illustrated processes are only examples. The processes may vary depending on the particular implementation. Further, while certain fields, messages, and information elements are used in these examples, the present disclosure is not limited thereto.

As illustrated in FIG. 3, the base station (e.g., eNB or gNB) transmits SI (SIB2), which includes mpdcch-NarrowbandsToMonitor (step 300). In this example, mpdcch-NarrowbandsToMonitor includes two possible values of the Msg2 DCI narrowband index ($NB_{RAR}$), which are denoted as $NB_{RAR}^{(0)}$ and $NB_{RAR}^{(1)}$. In addition, the base station transmits bit vectors, e.g., in some SIB which is referred to here as $SIB_X$ (step 302). As discussed above, the bit vectors have different lengths that correspond to different possible values of A, where A is the number of possible narrowbands in which Msg3/4 DCI may be located for the particular configuration of the UE. The UE receives the SIB2 including mpdcch-NarrowbandsToMonitorand further receives the bit vectors.

The UE determines a (sub)set of narrowbands on which to perform measurements (step 304). As discussed above, the determined set of narrowbands is a subset of all configured narrowbands (i.e., a subset of all possible narrowbands on which the Msg3/4 DCI may be transmitted). In some embodiments, the UE determines the (sub)set of narrowbands using the process described above for determining the set of narrowbands to measure (S) and the bit vector having the length that corresponds to the value of A for the UE's particular configuration.

In this example, during the time interval T1 and continuing for the interval T2, the UE performs measurements on the narrowbands in the determined (sub)set (step 306). Note that the measurement(s) may be performed on the narrowbands in the determined (sub)set during T1 and/or during T2.

The UE transmits Msg1 (i.e., an RA preamble) (step 308). The base station determines a set of narrowbands in which the base station can schedule Msg3/4 DCI (step 310). In some embodiments, the base station determines the set of narrowbands in which the base station can schedule Msg3/4 DCI using the process described above for determining the set of narrowbands in which the base station can schedule Msg3/4 DCI (V). In this particular embodiment, the base station determines the set of narrowbands in which the base station can schedule Msg4 DCI and utilizes a corresponding constraint(s) when scheduling Msg4, as described below.

The base station transmits Msg2 DCI (step 312). Note that mpdcch-NarrowbandsToMonitor includes, in this particular example, two possible values for $NB_{RAR}$, which are denoted as $NB_{RAR}^{(0)}$ and $NB_{RAR}^{(1)}$. Thus, the base station transmits the Msg2 DCI on one of the two narrowbands indicated by $NB_{RAR}^{(0)}$ and $NB_{RAR}^{(1)}$. The UE monitors both of these narrowbands and succeeds in decoding the Msg2 DCI on one of them. The UE then knows that $NB_{RAR}$ is the one two possible values ($NB_{RAR}^{(0)}$ and $NB_{RAR}^{(1)}$) that corresponds to the narrowband on which the UE successfully decoded the Msg2 DCI. For example, if the UE successfully decodes the Msg2 DCI on the narrowband that corresponds to $NB_{RAR}^{(1)}$, then the UE knows that $NB_{RAR}=NB_{RAR}^{(1)}$. The base station transmits Msg2 in accordance with the Msg2 DCI (step 314). Msg2 (i.e., the RAR) includes a Msg3/4 MPDCCH narrowband index. Using the Msg3/4 MPDCCH narrowband index, the UE is now able to determine the narrowband in which the Msg3/4 MPDCCH will be transmitted. The UE receives the Msg2 in accordance with the Msg2 DCI in step 314.

The UE transmits a Msg3 including a report of the measurement(s) or information derived from the measurement(s) made in step 306 (step 316). In this example, the base station schedules Msg4 DCI with the constraint(s) from step 310 (step 318) and transmits the Msg4 DCI accordingly (step 320). The base station transmits Msg4 in accordance with the Msg4 DCI (step 322).

In regard to the process illustrated in FIG. 4, the base station (e.g., eNB or gNB) transmits SI (SIB2), which includes mpdcch-NarrowbandsToMonitor (step 400). In this example, mpdcch-NarrowbandsToMonitor includes only one possible value of the Msg2 DCI narrowband index ($NB_{RAR}$), which is denoted as $NB_{RAR}^{(0)}$. In addition, the base station transmits the bit vectors, e.g., in some SIB which is referred to here as $SIB_X$ (step 402). As discussed above, the bit vectors have different lengths that correspond to different possible values of A, where A is the number of possible narrowbands in which Msg3/4 DCI may be located for the particular configuration of the UE. The UE receives the SIB2 including mpdcch-NarrowbandsToMonitorand further receives the bit vectors.

The UE determines a (sub)set of narrowbands on which to perform measurements (step 404). As discussed above, the determined set of narrowbands is a subset of all configured narrowbands (i.e., a subset of all possible narrowbands on which the Msg3/4 DCI may be transmitted). In some embodiments, the UE determines the (sub)set of narrowbands using the process described above for determining the set of narrowbands to measure (S) and the bit vector having the length that corresponds to the value of A for the UE's particular configuration. In addition, the base station determines the set of narrowbands to, in this embodiment, which to limit scheduling of Msg4 DCI (step 406).

In this example, during the time interval T1 and continuing for the interval T2, the UE performs measurements on the narrowbands in the determined (sub)set (step 408). Note that the measurement(s) may be performed on the narrowbands in the determined (sub)set during T1 and/or during T2.

The UE transmits Msg1 (i.e., a RA preamble) (step 410). The base station transmits Msg2 DCI (step 412). Note that mpdcch-NarrowbandsToMonitor includes, in this particular example, only one possible value for $NB_{RAR}$, which is denoted as $NB_{RAR}^{(0)}$. As such, the UE only monitors one narrowband (i.e., the narrowband that corresponds to $NB_{RAR}^{(0)}$) for the Msg2 DCI. Also, assuming that the UE successfully decodes the Msg2 DCI on the narrowband that corresponds to $NB_{RAR}^{(0)}$, the UE then knows that $NB_{RAR}=NB_{RAR}^{(0)}$. The base station transmits Msg2 in accordance with the Msg2 DCI (step 414). Msg2 (i.e., the RAR) includes a Msg3/4 MPDCCH narrowband index. Using the Msg3/4 MPDCCH narrowband index, the UE is able to determine the narrowband in which the Msg3/4 MPDCCH will be transmitted. The UE receives the Msg2 in accordance with the Msg2 DCI in step 412.

The UE transmits a Msg3 including a report of the measurement(s) or information derived from the measurement(s) made in step 408 (step 416). In this example, the base station schedules Msg4 DCI with the constraint(s) from step 406 (step 418) and transmits the Msg4 DCI accordingly (step 420). The base station transmits Msg4 in accordance with the Msg4 DCI (step 422).

Now, some additional embodiments and variations of the embodiments described above will be described. In one embodiment, the base station 202 transmits the bit vectors (e.g., in step 302) by broadcasting the vectors in SIB2 or any other broadcast message. In some embodiments, the base station broadcasts all of the bit vectors. In some other embodiments, the base station broadcasts all of the bit vectors with lengths smaller or equal to $N_{NB2}$. Also, if measurements are always required, at least one bit in each bit vector is set to "1"; otherwise the UE would not perform any measurement. In case the network does not want to constrain the scheduling of Msg3/4 MPDCCH, all bits in the configured vectors are set to 1.

In an alternate embodiment, the network (e.g., the base station) does not constrain the scheduling of Msg4 MPDCCH to one of the measured narrowbands, but it only attempts to do it if possible depending on some algorithm out of the scope of this document. In other words, in the embodiments above, the eNB will constrain Msg4 DCI (i.e., Msg4 MPDCCH) scheduling in one of the narrowbands measured by the UE (less than the total number of possible narrowbands in which Msg4 DCI may be scheduled in the current version of the NR specifications). However, in some implementations, such a tight constraint in the scheduling may not be desirable. Thus, in this alternate embodiment, the eNB is given flexibility with respect to the constraint. In particular, the eNB may or may not schedule the Msg4 DCI in one of the measured narrowbands. If the eNB does schedule Msg4 DCI in one of the measured narrowbands, than UE has a meaningful value to report in Msg3. Thus, in some embodiments, the eNB should try to schedule it in this way if possible. However, if the eNB does not schedule the Msg4 DCI in one of the measured narrowbands, the UE would not have measured the "correct" narrowband, but the UE could still report a different measurement or another metric.

In an alternate embodiment, in case of an EDT access in CE mode A, the aforementioned algorithm to determine S is modified as follows:
S=∅
For each bit $b_i$ of the bit vector ($i \in [0, N_{NB}-1]$)
    If $b_i == 1$
        Narrowband with index i is included in S In an alternate embodiment, the network can tie specific narrowband(s) to specific CE levels for RA. Thus, once the UE determines its CE level based upon the Reference Signal Received Power (RSRP) value, it knows the set of narrowbands on which it should perform the measurement. The mapping of CE level to narrowbands can be provided via RRC, SIB, or unicast signaling.

In another embodiment, the UE can wait until the decision of Msg1 preamble index and then perform the measurements on the (smaller) set of narrowbands V in T2.

Further, in a yet another alternate embodiment, the UE performs measurement on the paging narrowband(s) which it is supposed to monitor for paging and/or the one(s) required for blind decoding of UE Specific Search Space (USS) and/or Common Search Space (CSS).

In an alternate embodiment, the network (e.g., the base station 202) may increase the delay between Msg2 DCI and Msg2 and from Msg2 to Msg3 to increase the duration of T2 and give the UE more time to perform the measurements, if needed.

For the sake of clarification, the following examples are provided.

Example 1

Assuming the following:
  The carrier is configured with $N_{NB2}=8$
  The UE is performing a non-EDT access ($N_{NB}^{choices}=4$)
  The following information is broadcasted through SIB2 and SIBx:
    $NB_{RAR}^{(0)}=1$, $NB_{RAR}^{(1)}=3$
    $b^{(4)}=\{1, 0, 1, 0\}$ (the other bit vectors are not relevant)
The following events happen in sequence:
  1. UE decodes SIB2
  2. UE considers the bit vector with length $A=\min\{N_{NB2}, N_{NB}^{choices}\}=\min\{8, 4\}=4$
  3. UE determines the set of narrowbands to measure using introduced algorithm ($S \equiv \{NB_1, NB_3, NB_5\}$)
  4. UE performs the measurements on the narrowbands during T1
  5. UE transmits Msg1 with an odd preamble index
  6. Network schedules Msg2 DCI in $NB_{RAR}^{(1)}=NB_{RAR}=3$
  7. Network determines the set of possible narrowbands in which to schedule Msg4 DCI ($V \equiv \{NB_3, NB_5\}$)
  8. Network schedules Msg3/4 DCI in $NB_5$ and indicates this in the RAR in Msg2 sent to the UE
  9. UE transmits the report of $NB_5$ in Msg3

Example 2

Assuming the following:
  The carrier is configured with $N_{NB2}=2$
  The UE in CE mode B is performing an EDT access ($N_{NB}^{choices}=8$)
  The following information is broadcasted through SIB2 and SIBx:
    $NB_{RAR}^{(0)}=0$
    $b^{(2)}=\{1, 0\}$ (the other bit vectors are not relevant)
The following events happen in sequence:
  1. UE decodes SIB2
  2. UE considers the bit vector with length $A=\min\{N_{NB2}, N_{NB}^{choices}\}=\min\{2, 8\}=2$ Notice that in a system with $N_{NB2} \leq 4$, $A=N_{NB2}$ regardless of the type of access performed by the UE.
  3. UE determines the set of narrowbands to measure using introduced algorithm ($S \equiv \{NB_0\}$)
  4. UE performs the measurement on the narrowbands during T1
  5. UE transmits Msg1
  6. Network schedules Msg2 DCI in $NB_{RAR}^{(0)}=NB_{RAR}=0$
  7. Network determines the set of possible narrowbands in which to schedule Msg4 DCI ($V \equiv \{NB_0\}$)
  8. Network schedules Msg3/4 DCI in $NB_0$ and indicates this in the RAR in Msg2 sent to the UE
  9. UE transmits the report of $NB_0$ in Msg3

Example 3

Assuming the following:
  The carrier is configured with $N_{NB2}=8$
  The UE in CE mode A is performing an EDT access ($N_{NB}^{choices}=N_{NB2}$)

The following information is broadcasted through SIB2 and SIBx:

$NB_{RAR}^{(0)}=3$ $b^{(8)}=\{1, 0, 1, 0, 0, 0, 0, 1\}$ (the other bit vectors are not relevant)

The following events happen in sequence:
1. UE decodes SIB2
2. UE considers the bit vector with length $A=\min\{N_{NB2}, N_{NB}^{choices}\}=\min\{8, 8\}=8$
3. UE determines the set of narrowbands to measure using introduced algorithm ($S\equiv\{NB_3, NB_5, NB_2\}$)
4. UE performs the measurement on the narrowbands during T1
5. UE transmits Msg1
6. Network schedules Msg2 DCI in $NB_{RAR}^{(0)}=NB_{RAR}=3$
7. Network determines the set of possible narrowbands in which to schedule Msg4 DCI ($V\equiv\{NB_3, NB_5, NB_2\}$)
8. Network schedules Msg3/4 DCI in $NB_2$ and indicates this in the RAR in Msg2 sent to UE
9. UE transmits the report of $NB_2$ in Msg3

Now, the discussion turns to embodiments relating to combining measurements made on different narrowbands during different timing occasions (i.e., different time intervals). In some embodiments, this combining is performed by combining (e.g., averaging) weighted measurements made on the different narrowbands during the different timing occasions.

In this regard, a UE (e.g., an MTC UE) may monitor different narrowbands before transmitting Msg3. From the network (e.g., base station 202) perspective, a long-term averaging of measurements performed on different narrowbands could be beneficial to gauge the overall interference situation. Over the long term, it is expected that the overall narrowband's quality level would not vary much (considering the power allocation and power boosting, etc. are same). For example, if one of the narrowband's RSRP and/or Reference Signal Received Quality (RSRQ) level degrades, the UE may switch to another narrowband as part of cell reselection and thus the situation may improve again as a result of the UE moving out of the narrowband.

Figure 5:
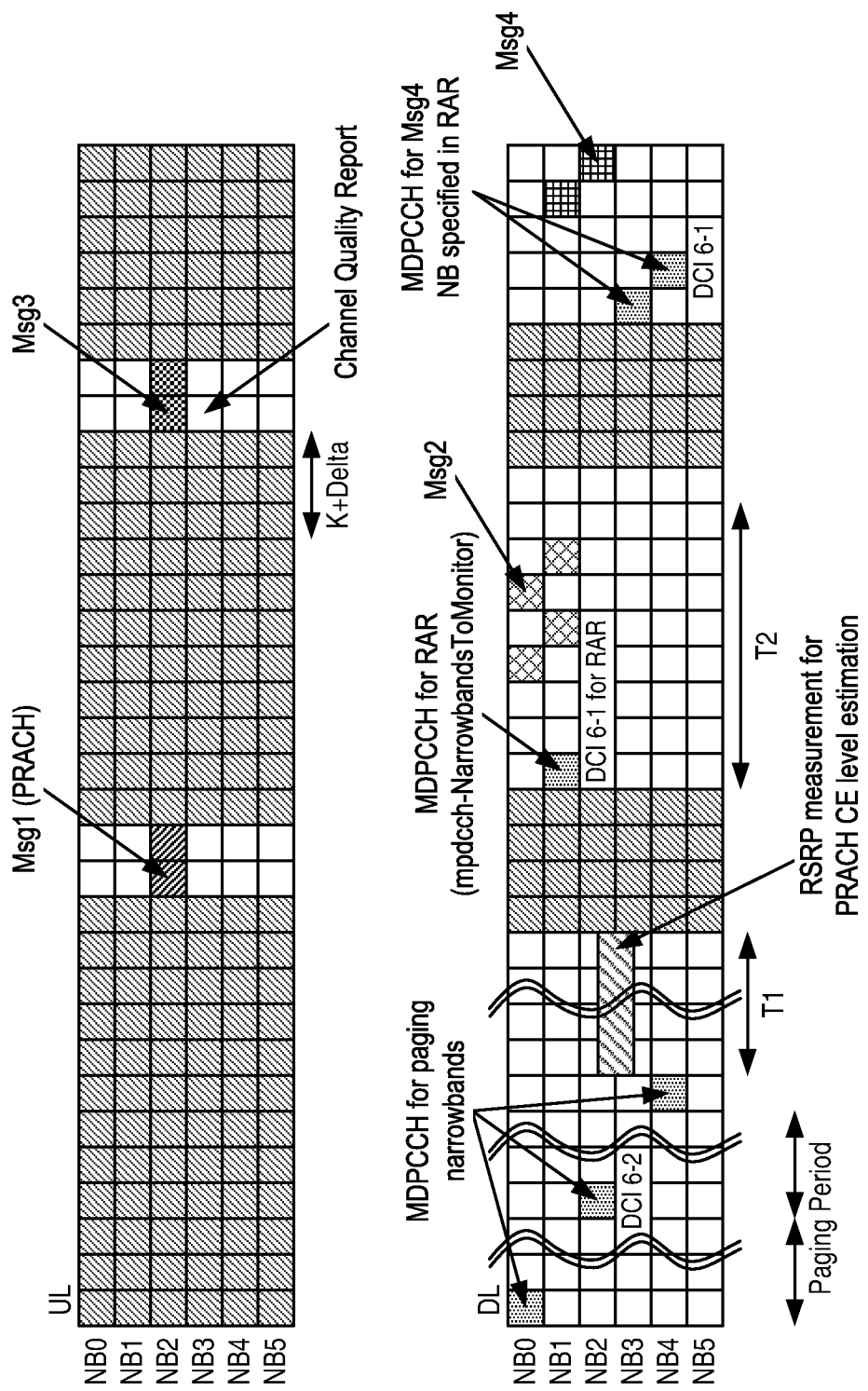
FIG. 5 illustrates an example for illustration of some aspects of some embodiments of the present disclosure.

FIG. 5 illustrates an example. As shown in the example of FIG. 5, an MTC UE measures on, e.g., four different narrowbands before sending Msg3. At first, the UE measures NB0, NB2, and NB4 for paging, then the UE monitors the six central PRBs to determine the CE level. For reception of DCI of the RAR message, the UE monitors NB1 and NB2. Then, for the reception of PDSCH for the RAR message, the UE monitors NB0 and NB1. In some embodiments, these measurements (or at least some of these measurements) made on different narrowbands during different timing occasions are combined (e.g., by averaging or weighted average) to provide a combined (also referred to as aggregate) measurement, which the UE then reports to the network (e.g., the base station 202), e.g., in Msg3.

A UE (e.g., a BL/CE UE or MTC UE) may not be able to monitor narrowbands other than the ones configured for paging and RA or the ones where transmission (e.g., transmission of RAR DCI, etc.) is happening, mainly because there may not be CRS transmission in other narrowbands if CRS muting is enabled in the cell and also because the UE can only tune to one narrowband at a time. In such cases, it would be beneficial if the UE regularly keeps track of the average quality (e.g., Signal to Interference plus Noise Ratio (SINR), RSRP, and/or RSRQ) of the narrowbands that the UE traverses (i.e., the narrowbands that that UE monitors).

The average may be computed as a weighted average among the tracked narrowbands, where, as an example, the NW may indicate the weights to apply or the weights can be deduced by the UE. Further, as different channels would be transmitted in different narrowbands (for example, as shown above MPDCCH of RAR is transmitted in NB1 and Msg2 RAR PDSCH is transmitted in NB0), in terms of robustness, it is also beneficial for the UE to keep on a track of the quality levels of different channels along with the narrowbands.

In one embodiment, the UE monitors different narrowbands and computes a combination (e.g., average or weighted average) of the measurements. The value is then provided to the NW, e.g., in Msg3. In an alternate embodiment, when there is a longer gap between T1 and T2, then the UE drops the T1 measurement or marginally considers measurements obtained during T1 (e.g., low weight in a weighted average). Further, different computation can be applied for measurements performed in T1 and T2. The measurement gap between T1 and T2 that would be valid for T1 measurement to be considered can be also signaled by the NW. Further, different measurement combinations can be performed during T2. A measurement combination refers to how the UE combines (e.g., averages or weighted average) different measurements collected from different narrowbands at different time occasions.

In one embodiment, various parameters (e.g., weights) that the UE is to apply for the aforementioned combination would be signaled by the NW (e.g., in a Radio Resource Control (RRC) message), either via broadcast or unicast signaling. In an alternate embodiment, the various parameters may be included in DCI (e.g., Msg2 DCI). The parameters could be different weights that the UE may apply for different narrowbands for the measurements or basically could be biasing parameters influencing the measurement results obtained during measurements from different narrowbands at different time occasions.

Consider an example in which the measurement duration between T1 and T2 is less than a few ms, the average RSRP value during T1 is −110 decibel-milliwatts (dBm), and the RSRP measurement obtained during T2 is −90 dBm. In one specific example, the UE determines an average (which is −100 dBm) of the two values and reports the average in the Msg3 report. However, as another specific example in which the measurement duration between T1 and T2 is more than several seconds (e.g., 100 seconds), then the UE may drop the measurement obtained at T1 and simply report −90 dBm in Msg3 because the measurement at T1 is obsolete. The average of powers can also be calculated in a linear scale (watt) and further instead of averaging combination or aggregation using different metrics could be performed.

In an alternate embodiment, the UE sends, to the network (e.g., the base station 202), a flag (or indicator) to denote that the reported measurement is a combination measurement and/or an indication of the parameters used for the calculation. This may be included in the Msg3 report. In one embodiment, the UE selects the parameters by itself.

In some embodiments, the goal is to optimize the bolded parameter below [36.331]:

```
Maximum numbers of repetitions for UE-SS for MPDCCH, see TS 36.211 [21].
mpdcch-config-r13                    CHOICE {
        release                      NULL,
        setup                        SEQUENCE {
            csi-NumRepetitionCE-r13       ENUMERATED {sf1, sf2, sf4, sf8, sf16,
sf32},
            mpdcch-pdsch-HoppingConfig-r13  ENUMERATED {on,off},
            mpdcch-StartSF-UESS-r13       CHOICE {
                fdd-r13                   ENUMERATED {v1, v1dot5, v2,
v2dot5, v4,
                                             v5, v8, v10},
                tdd-r13                   ENUMERATED {v1, v2, v4, v5, v8, v10,
                                             v20, spare1}
            },
            mpdcch-NumRepetition-r13      ENUMERATED {r1, r2, r4, r8, r16,
                                             r32, r64, r128, r256},
            mpdcch-Narrowband-r13         INTEGER (1.. maxAvailNarrowBands-r13)
        }
```

The parameter, mpdcch-NumRepetition-r13 defines the maximum numbers of repetitions for USS for MPDCCH, see Technical Specification (TS) 36.211.

Thus, a combination of measurements obtained from various narrowbands could help the NW determine the mpdcch-NumRepetition when the UE becomes CONNECTED status.

In another embodiment, once the UE has performed measurements on all the narrowbands indicated by the network, for example, using the process described above with respect to FIG. 3 or FIG. 4, the UE can derive the number of repetitions for each narrowband itself and report in Msg3 the maximum number of repetitions for each narrowband to facilitate the decision at the network when configuring the mpdcch-NumRepetition parameter in Msg4. Alternatively, the UE can report in Msg3 the averaged maximum number of repetitions on all narrowbands being measured.

Figure 6:
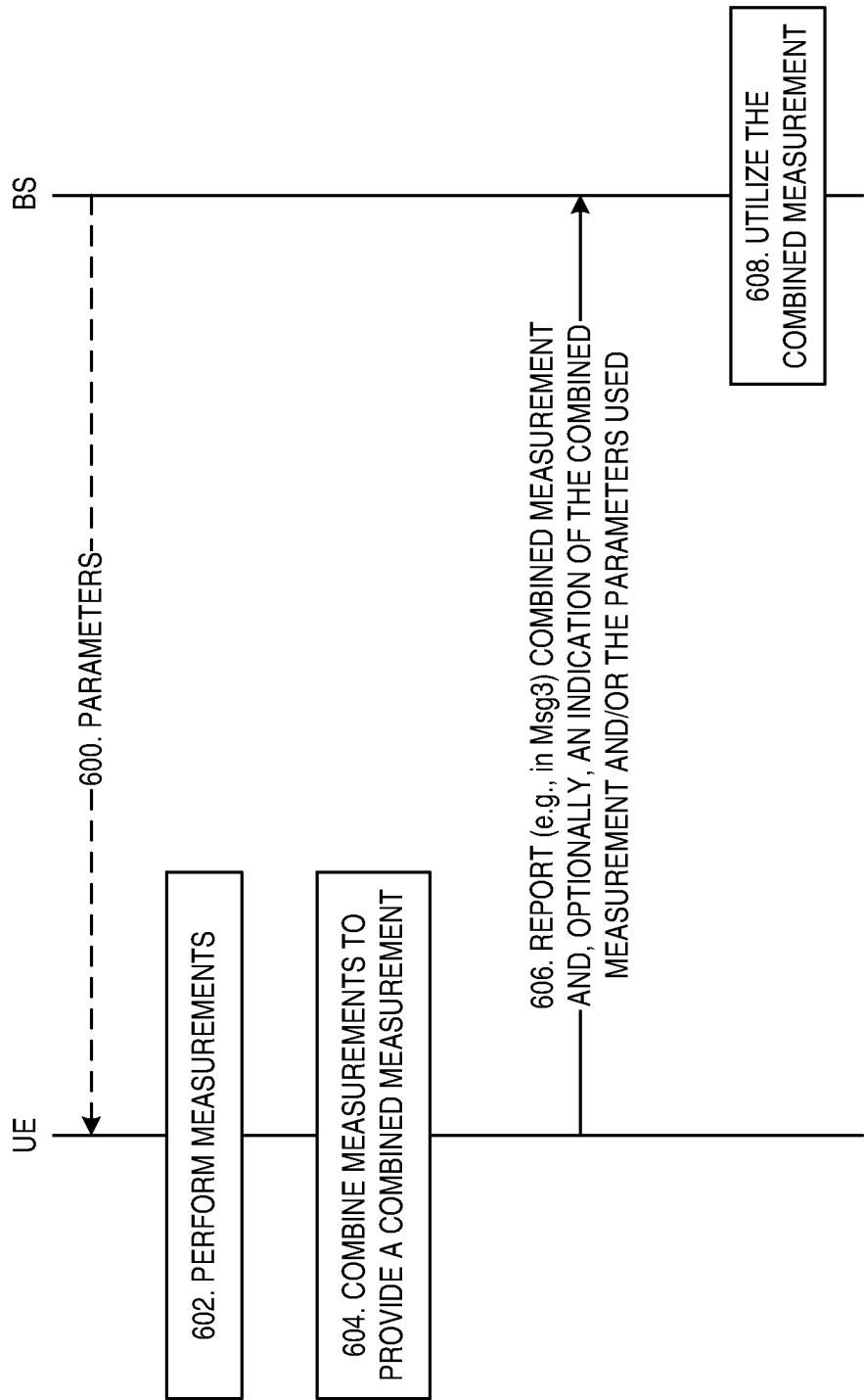
FIG. 6 illustrates the operation of a UE and a base station where the UE combines measurements and reports the combined measurement in accordance with at least some aspects of some embodiments of the present disclosure.

FIG. 6 illustrates the operation of a UE (e.g., a wireless device 212) and a base station (e.g., a base station 202) where the UE combines measurements and reports the combined measurement in accordance with at least some aspects of the embodiments described above. In this figure, dashed lines are used to represent optional steps. As illustrated, the base station optionally sends one or more parameters to the UE (step 600). These parameters are parameters that indicate to the UE how the UE is to combine measurements. For example, if a weighted average is used, the parameters may include the weights to be applied to the measurements. The UE performs measurements, as described above (step 602). For example, the UE may perform measurements on different narrowbands during different time intervals. For instance, the UE may perform measurements on a first set of narrowbands during a first time interval (e.g., the time interval T1 prior to the UE transmitting the RA preamble in an RA procedure) and perform measurements on a second set of narrowbands during a second time interval (e.g., the time interval T2 between the start of reception of the RAR DCI and the transmission of Msg3 during the RA procedure), where the first and second sets of narrowbands are different (i.e., at least one narrowband in the first set of narrowbands is not in the second set of narrowbands and/or at least one narrowband in the second set of narrowbands is not in the first set of narrowbands). One example of the different narrowbands in the different time intervals is illustrated in FIG. 5, which is described above.

The UE combines the measurements, thereby providing a combined measurement (step 604). As discussed above, a combination scheme may be used. As an example, the UE may compute the combined measurement as (or as a function of) an average or weighted average of the measurements (or at least some of the measurements). The UE reports the combined measurement to the base station, e.g., in Msg3 (step 606). Optionally, the UE may also send (e.g., in the report) an indication that the reported measurement is a combined measurement and/or an indication(s) of the parameter(s) used by the UE to compute the combined measurement, as described above. The base station may then utilize the combined measurement (step 608). For example, the base station may utilize the combined measurement to select the number of repetitions to utilize for MPDCCH and/or PDSCH transmission.

Note that while the process of FIG. 6 is described separately from the embodiments of FIGS. 3 and 4, the embodiments illustrated in FIG. 6 and FIGS. 3 and 4 can be combined. For instance, in step 316 of FIG. 3, the UE may report a combined measurement in addition to or as an alternative to the measurements made in step 306.

Figure 7:
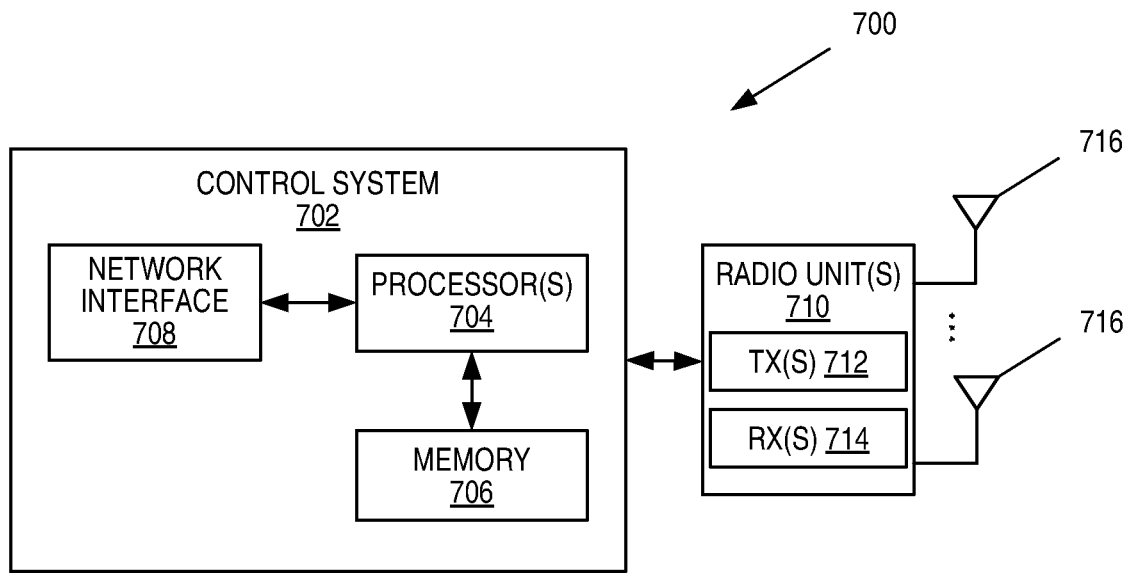
FIGS. 7 through 9 are schematic block diagrams of example embodiments of a radio access node (e.g., a base station)

FIG. 7 is a schematic block diagram of a radio access node 700 according to some embodiments of the present disclosure. The radio access node 700 may be, for example, a base station 202 or 206. As illustrated, the radio access node 700 includes a control system 702 that includes one or more processors 704 (e.g., Central Processing Units (CPUs), Application Specific Integrated Circuits (ASICs), Field Programmable Gate Arrays (FPGAs), and/or the like), memory 706, and a network interface 708. The one or more processors 704 are also referred to herein as processing circuitry. In addition, the radio access node 700 includes one or more radio units 710 that each includes one or more transmitters 712 and one or more receivers 714 coupled to one or more antennas 716. The radio units 710 may be referred to or be part of radio interface circuitry. In some embodiments, the radio unit(s) 710 is external to the control system 702 and connected to the control system 702 via, e.g., a wired connection (e.g., an optical cable). However, in some other embodiments, the radio unit(s) 710 and potentially the antenna(s) 716 are integrated together with the control system 702. The one or more processors 704 operate to provide one or more functions of a radio access node 700 as described herein. In some embodiments, the function(s) are implemented in software that is stored, e.g., in the memory 706 and executed by the one or more processors 704.

Figure 8:
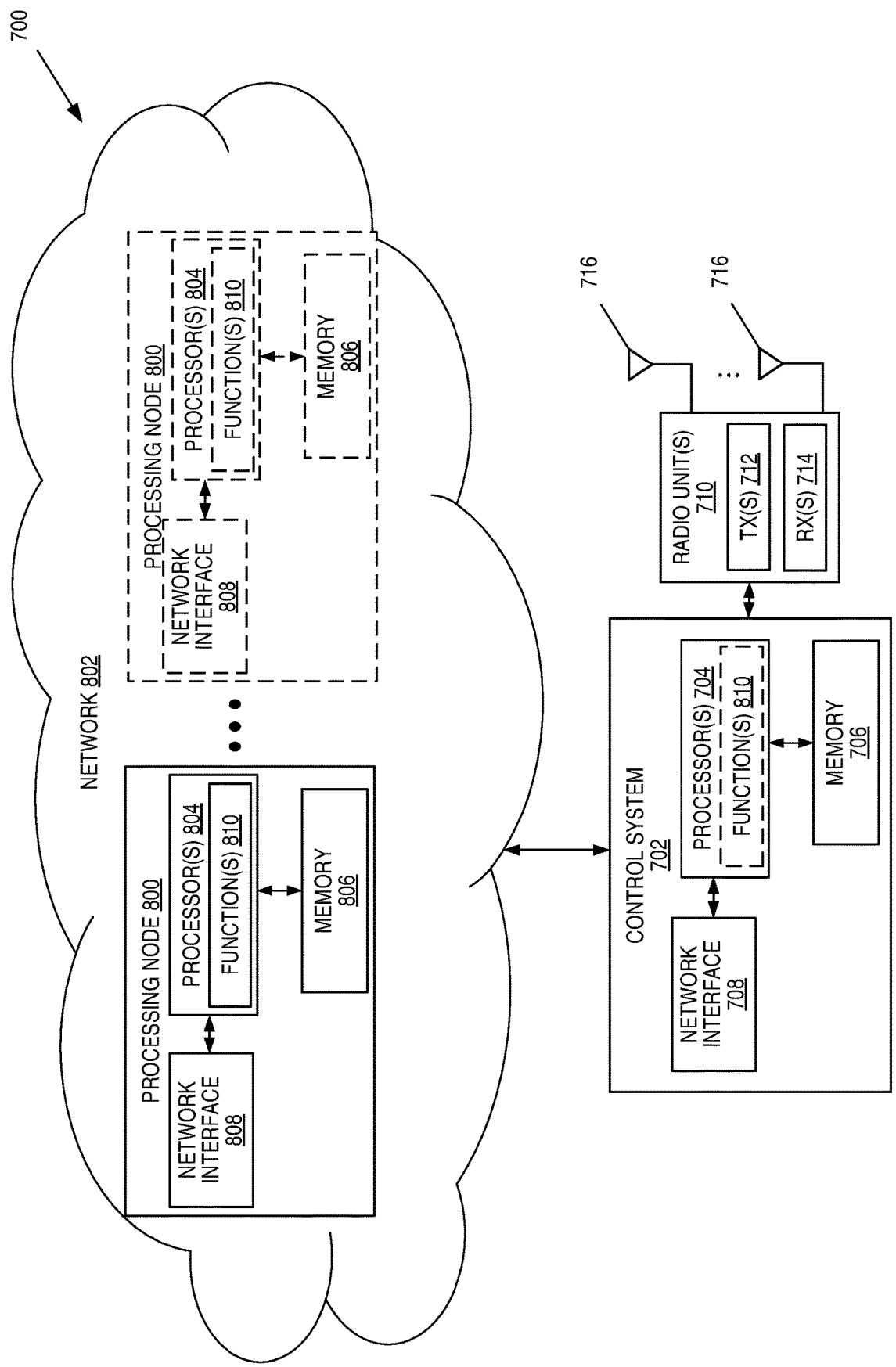

FIG. 8 is a schematic block diagram that illustrates a virtualized embodiment of the radio access node 700 according to some embodiments of the present disclosure. This discussion is equally applicable to other types of network nodes. Further, other types of network nodes may have similar virtualized architectures.

As used herein, a "virtualized" radio access node is an implementation of the radio access node 700 in which at least a portion of the functionality of the radio access node 700 is implemented as a virtual component(s) (e.g., via a virtual machine(s) executing on a physical processing node(s) in a network(s)). As illustrated, in this example, the radio access node 700 includes the control system 702 that includes the one or more processors 704 (e.g., CPUs, ASICs, FPGAs, and/or the like), the memory 706, and the network interface 708 and the one or more radio units 710 that each includes the one or more transmitters 712 and the one or more receivers 714 coupled to the one or more antennas 716, as described above. The control system 702 is connected to the radio unit(s) 710 via, for example, an optical cable or the like. The control system 702 is connected to one or more processing nodes 800 coupled to or included as part of a network(s) 802 via the network interface 708. Each processing node 800 includes one or more processors 804 (e.g., CPUs, ASICs, FPGAs, and/or the like), memory 806, and a network interface 808.

In this example, functions 810 of the radio access node 700 described herein are implemented at the one or more processing nodes 800 or distributed across the control system 702 and the one or more processing nodes 800 in any desired manner. In some particular embodiments, some or all of the functions 810 of the radio access node 700 described herein are implemented as virtual components executed by one or more virtual machines implemented in a virtual environment(s) hosted by the processing node(s) 800. As will be appreciated by one of ordinary skill in the art, additional signaling or communication between the processing node(s) 800 and the control system 702 is used in order to carry out at least some of the desired functions 810. Notably, in some embodiments, the control system 702 may not be included, in which case the radio unit(s) 710 communicate directly with the processing node(s) 800 via an appropriate network interface(s).

In some embodiments, a computer program including instructions which, when executed by at least one processor, causes the at least one processor to carry out the functionality of radio access node 700 or a node (e.g., a processing node 800) implementing one or more of the functions 810 of the radio access node 700 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 9:
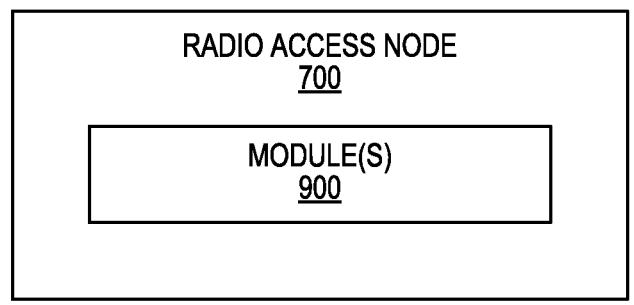

FIG. 9 is a schematic block diagram of the radio access node 700 according to some other embodiments of the present disclosure. The radio access node 700 includes one or more modules 900, each of which is implemented in software. The module(s) 900 provide the functionality of the radio access node 700 described herein. This discussion is equally applicable to the processing node 800 of FIG. 8 where the modules 900 may be implemented at one of the processing nodes 800 or distributed across multiple processing nodes 800 and/or distributed across the processing node(s) 800 and the control system 702.

Figure 10:
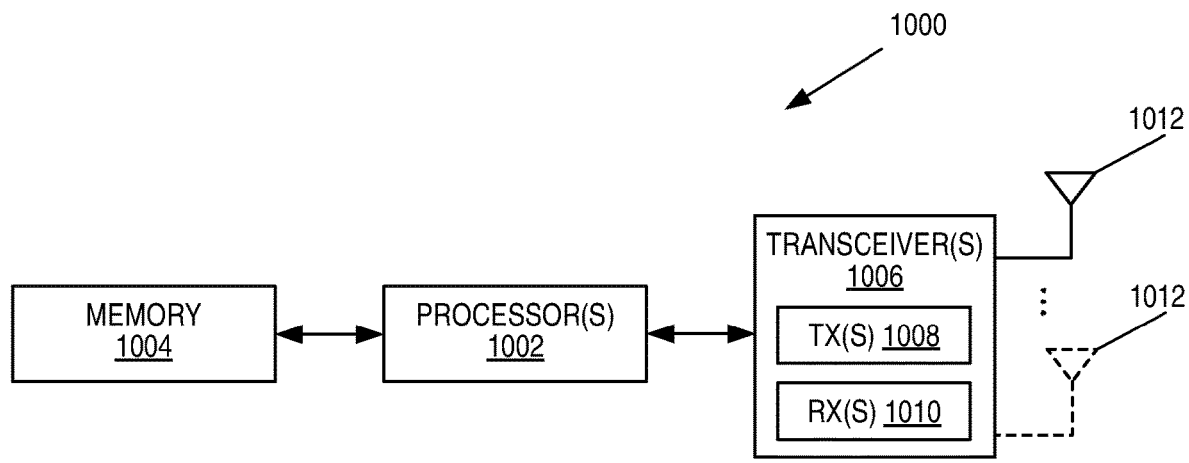
FIGS. 10 and 11 are schematic block diagrams of example embodiments of a wireless device (e.g., a UE)

FIG. 10 is a schematic block diagram of a UE 1000 according to some embodiments of the present disclosure. As illustrated, the UE 1000 includes one or more processors 1002 (e.g., CPUs, ASICs, FPGAs, and/or the like), memory 1004, and one or more transceivers 1006 each including one or more transmitters 1008 and one or more receivers 1010 coupled to one or more antennas 1012. The transceiver(s) 1006 includes radio-front end circuitry connected to the antenna(s) 1012 that is configured to condition signals communicated between the antenna(s) 1012 and the processor(s) 1002, as will be appreciated by on of ordinary skill in the art. The processors 1002 are also referred to herein as processing circuitry. The transceivers 1006 are also referred to herein as radio circuitry. In some embodiments, the functionality of the UE 1000 described above may be fully or partially implemented in software that is, e.g., stored in the memory 1004 and executed by the processor(s) 1002. Note that the UE 1000 may include additional components not illustrated in FIG. 10 such as, e.g., one or more user interface components (e.g., an input/output interface including a display, buttons, a touch screen, a microphone, a speaker(s), and/or the like and/or any other components for allowing input of information into the UE 1000 and/or allowing output of information from the UE 1000), a power supply (e.g., a battery and associated power circuitry), etc.

In some embodiments, a computer program including instructions which, when executed by at least one processor, causes the at least one processor to carry out the functionality of the UE 1000 according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 11:
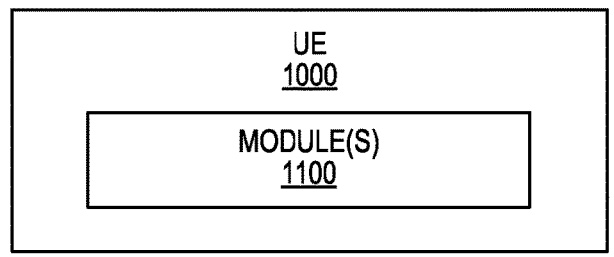

FIG. 11 is a schematic block diagram of the UE 1000 according to some other embodiments of the present disclosure. The UE 1000 includes one or more modules 1100, each of which is implemented in software. The module(s) 1100 provide the functionality of the UE 1000 described herein.

Figure 12:
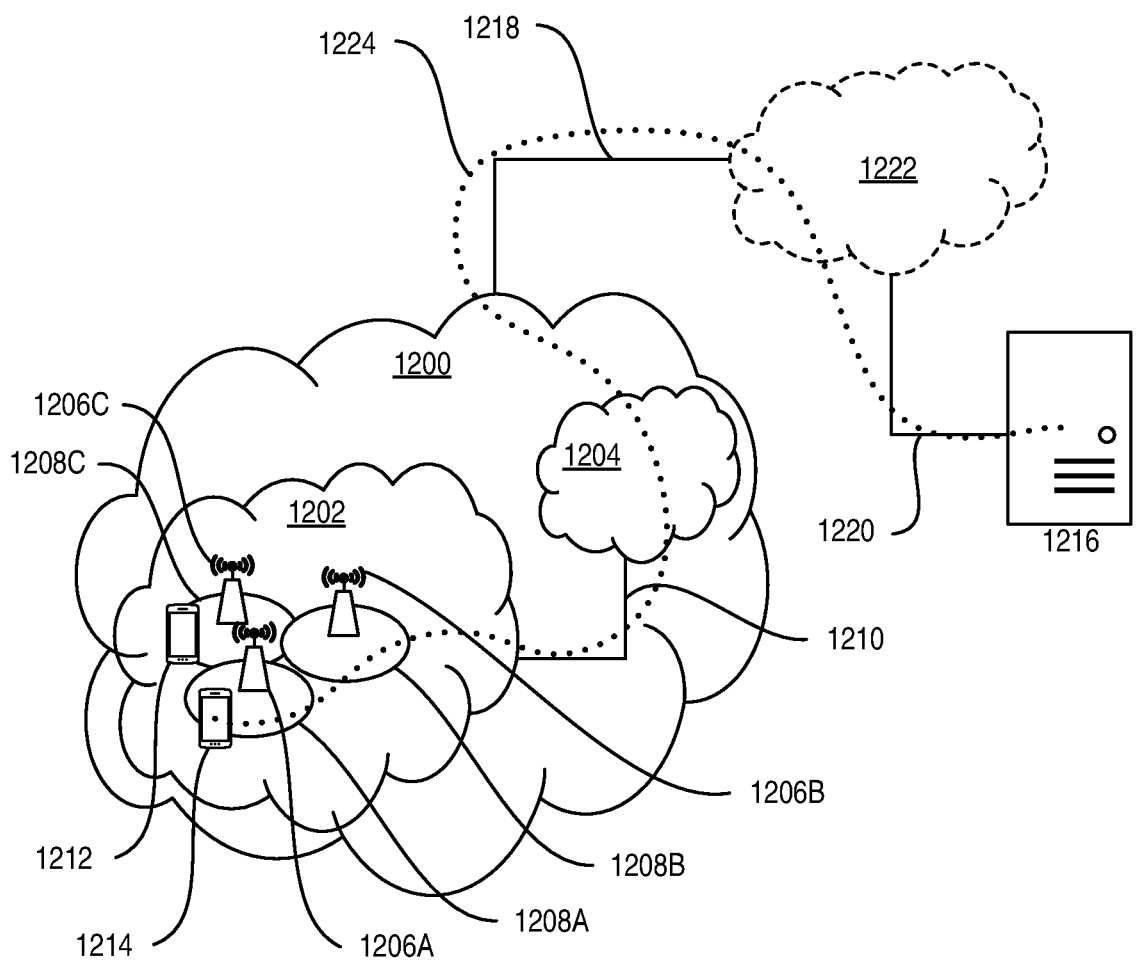
FIG. 12 illustrates an example communication system in which embodiments of the present disclosure may be implemented.

With reference to FIG. 12, in accordance with an embodiment, a communication system includes a telecommunication network 1200, such as a 3GPP-type cellular network, which comprises an access network 1202, such as a RAN, and a core network 1204. The access network 1202 comprises a plurality of base stations 1206A, 1206B, 1206C, such as Node Bs, eNBs, gNBs, or other types of wireless Access Points (APs), each defining a corresponding coverage area 1208A, 1208B, 1208C. Each base station 1206A, 1206B, 1206C is connectable to the core network 1204 over a wired or wireless connection 1210. A first UE 1212 located in coverage area 1208C is configured to wirelessly connect to, or be paged by, the corresponding base station 1206C. A second UE 1214 in coverage area 1208A is wirelessly connectable to the corresponding base station 1206A. While a plurality of UEs 1212, 1214 are illustrated in this example, the disclosed embodiments are equally applicable to a situation where a sole UE is in the coverage area or where a sole UE is connecting to the corresponding base station 1206.

The telecommunication network 1200 is itself connected to a host computer 1216, which may be embodied in the hardware and/or software of a standalone server, a cloud-implemented server, a distributed server, or as processing resources in a server farm. The host computer 1216 may be under the ownership or control of a service provider, or may be operated by the service provider or on behalf of the service provider. Connections 1218 and 1220 between the telecommunication network 1200 and the host computer 1216 may extend directly from the core network 1204 to the host computer 1216 or may go via an optional intermediate network 1222. The intermediate network 1222 may be one of, or a combination of more than one of, a public, private, or hosted network; the intermediate network 1222, if any, may be a backbone network or the Internet; in particular, the intermediate network 1222 may comprise two or more sub-networks (not shown).

The communication system of FIG. 12 as a whole enables connectivity between the connected UEs 1212, 1214 and the host computer 1216. The connectivity may be described as an Over-the-Top (OTT) connection 1224. The host computer 1216 and the connected UEs 1212, 1214 are configured to communicate data and/or signaling via the OTT connection 1224, using the access network 1202, the core network 1204, any intermediate network 1222, and possible further infrastructure (not shown) as intermediaries. The OTT connection 1224 may be transparent in the sense that the participating communication devices through which the OTT connection 1224 passes are unaware of routing of uplink and downlink communications. For example, the base station 1206 may not or need not be informed about the past routing of an incoming downlink communication with data originating from the host computer 1216 to be forwarded (e.g., handed over) to a connected UE 1212. Similarly, the base station 1206 need not be aware of the future routing of an outgoing uplink communication originating from the UE 1212 towards the host computer 1216.

Example implementations, in accordance with an embodiment, of the UE, base station, and host computer discussed in the preceding paragraphs will now be described with reference to FIG. 13. In a communication system 1300, a host computer 1302 comprises hardware 1304 including a communication interface 1306 configured to set up and maintain a wired or wireless connection with an interface of a different communication device of the communication system 1300. The host computer 1302 further comprises processing circuitry 1308, which may have storage and/or processing capabilities. In particular, the processing circuitry 1308 may comprise one or more programmable processors, ASICs, FPGAs, or combinations of these (not shown) adapted to execute instructions. The host computer 1302 further comprises software 1310, which is stored in or accessible by the host computer 1302 and executable by the processing circuitry 1308. The software 1310 includes a host application 1312. The host application 1312 may be operable to provide a service to a remote user, such as a UE 1314 connecting via an OTT connection 1316 terminating at the UE 1314 and the host computer 1302. In providing the service to the remote user, the host application 1312 may provide user data which is transmitted using the OTT connection 1316.

The communication system 1300 further includes a base station 1318 provided in a telecommunication system and comprising hardware 1320 enabling it to communicate with the host computer 1302 and with the UE 1314. The hardware 1320 may include a communication interface 1322 for setting up and maintaining a wired or wireless connection with an interface of a different communication device of the communication system 1300, as well as a radio interface 1324 for setting up and maintaining at least a wireless connection 1326 with the UE 1314 located in a coverage area (not shown in FIG. 13) served by the base station 1318. The communication interface 1322 may be configured to facilitate a connection 1328 to the host computer 1302. The connection 1328 may be direct or it may pass through a core network (not shown in FIG. 13) of the telecommunication system and/or through one or more intermediate networks outside the telecommunication system. In the embodiment shown, the hardware 1320 of the base station 1318 further includes processing circuitry 1330, which may comprise one or more programmable processors, ASICs, FPGAs, or combinations of these (not shown) adapted to execute instructions. The base station 1318 further has software 1332 stored internally or accessible via an external connection.

The communication system 1300 further includes the UE 1314 already referred to. The UE's 1314 hardware 1334 may include a radio interface 1336 configured to set up and maintain a wireless connection 1326 with a base station serving a coverage area in which the UE 1314 is currently located. The hardware 1334 of the UE 1314 further includes processing circuitry 1338, which may comprise one or more programmable processors, ASICs, FPGAs, or combinations of these (not shown) adapted to execute instructions. The UE 1314 further comprises software 1340, which is stored in or accessible by the UE 1314 and executable by the processing circuitry 1338. The software 1340 includes a client application 1342. The client application 1342 may be operable to provide a service to a human or non-human user via the UE 1314, with the support of the host computer 1302. In the host computer 1302, the executing host application 1312 may communicate with the executing client application 1342 via the OTT connection 1316 terminating at the UE 1314 and the host computer 1302. In providing the service to the user, the client application 1342 may receive request data from the host application 1312 and provide user data in response to the request data. The OTT connection 1316 may transfer both the request data and the user data. The client application 1342 may interact with the user to generate the user data that it provides.

Figure 13:
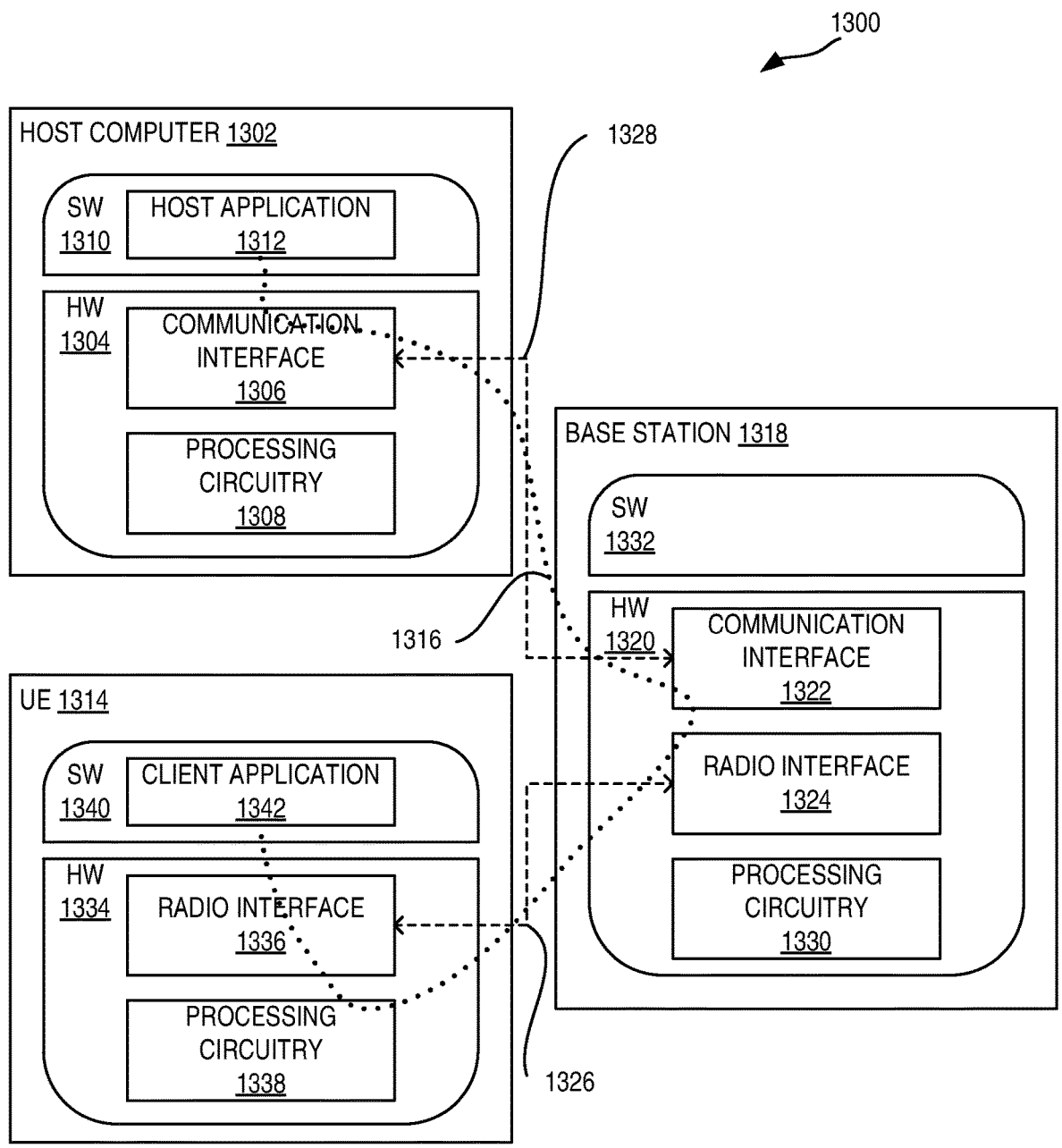
FIG. 13 illustrates example embodiments of the UE, base station, and host computer of FIG. 12.

It is noted that the host computer 1302, the base station 1318, and the UE 1314 illustrated in FIG. 13 may be similar or identical to the host computer 1216, one of the base stations 1206A, 1206B, 1206C, and one of the UEs 1212, 1214 of FIG. 12, respectively. This is to say, the inner workings of these entities may be as shown in FIG. 13 and independently, the surrounding network topology may be that of FIG. 12.

In FIG. 13, the OTT connection 1316 has been drawn abstractly to illustrate the communication between the host computer 1302 and the UE 1314 via the base station 1318 without explicit reference to any intermediary devices and the precise routing of messages via these devices. The network infrastructure may determine the routing, which may be configured to hide from the UE 1314 or from the service provider operating the host computer 1302, or both. While the OTT connection 1316 is active, the network infrastructure may further take decisions by which it dynamically changes the routing (e.g., on the basis of load balancing consideration or reconfiguration of the network).

The wireless connection 1326 between the UE 1314 and the base station 1318 is in accordance with the teachings of the embodiments described throughout this disclosure. One or more of the various embodiments improve the performance of OTT services provided to the UE 1314 using the OTT connection 1316, in which the wireless connection 1326 forms the last segment. More precisely, the teachings of these embodiments may improve, e.g., data rate, latency, and/or power consumption and thereby provide benefits such as, e.g., reduced user waiting time, relaxed restriction on file size, better responsiveness, and/or extended battery lifetime.

A measurement procedure may be provided for the purpose of monitoring data rate, latency, and other factors on which the one or more embodiments improve. There may further be an optional network functionality for reconfiguring the OTT connection 1316 between the host computer 1302 and the UE 1314, in response to variations in the measurement results. The measurement procedure and/or the network functionality for reconfiguring the OTT connection 1316 may be implemented in the software 1310 and the hardware 1304 of the host computer 1302 or in the software 1340 and the hardware 1334 of the UE 1314, or both. In some embodiments, sensors (not shown) may be deployed in or in association with communication devices through which the OTT connection 1316 passes; the sensors may participate in the measurement procedure by supplying values of the monitored quantities exemplified above, or supplying values of other physical quantities from which the software 1310, 1340 may compute or estimate the monitored quantities. The reconfiguring of the OTT connection 1316 may include message format, retransmission settings, preferred routing, etc.; the reconfiguring need not affect the base station 1318, and it may be unknown or imperceptible to the base station 1318. Such procedures and functionalities may be known and practiced in the art. In certain embodiments, measurements may involve proprietary UE signaling facilitating the host computer 1302's measurements of throughput, propagation times, latency, and the like. The measurements may be implemented in that the software 1310 and 1340 causes messages to be transmitted, in particular empty or 'dummy' messages, using the OTT connection 1316 while it monitors propagation times, errors, etc.

FIG. 14 is a flowchart illustrating a method implemented in a communication system, in accordance with one embodiment. The communication system includes a host computer, a base station, and a UE which may be those described with reference to FIGS. 12 and 13. For simplicity of the present disclosure, only drawing references to FIG. 14 will be included in this section. In step 1400, the host computer provides user data. In sub-step 1402 (which may be optional) of step 1400, the host computer provides the user data by executing a host application. In step 1404, the host computer initiates a transmission carrying the user data to the UE. In step 1406 (which may be optional), the base station transmits to the UE the user data which was carried in the transmission that the host computer initiated, in accordance with the teachings of the embodiments described throughout this disclosure. In step 1408 (which may also be optional), the UE executes a client application associated with the host application executed by the host computer.

FIG. 15 is a flowchart illustrating a method implemented in a communication system, in accordance with one embodiment. The communication system includes a host computer, a base station, and a UE which may be those described with reference to FIGS. 12 and 13. For simplicity of the present disclosure, only drawing references to FIG. 15 will be included in this section. In step 1500 of the method, the host computer provides user data. In an optional sub-step (not shown) the host computer provides the user data by executing a host application. In step 1502, the host computer initiates a transmission carrying the user data to the UE. The transmission may pass via the base station, in accordance with the teachings of the embodiments described throughout this disclosure. In step 1504 (which may be optional), the UE receives the user data carried in the transmission.

Figures 16, 17:
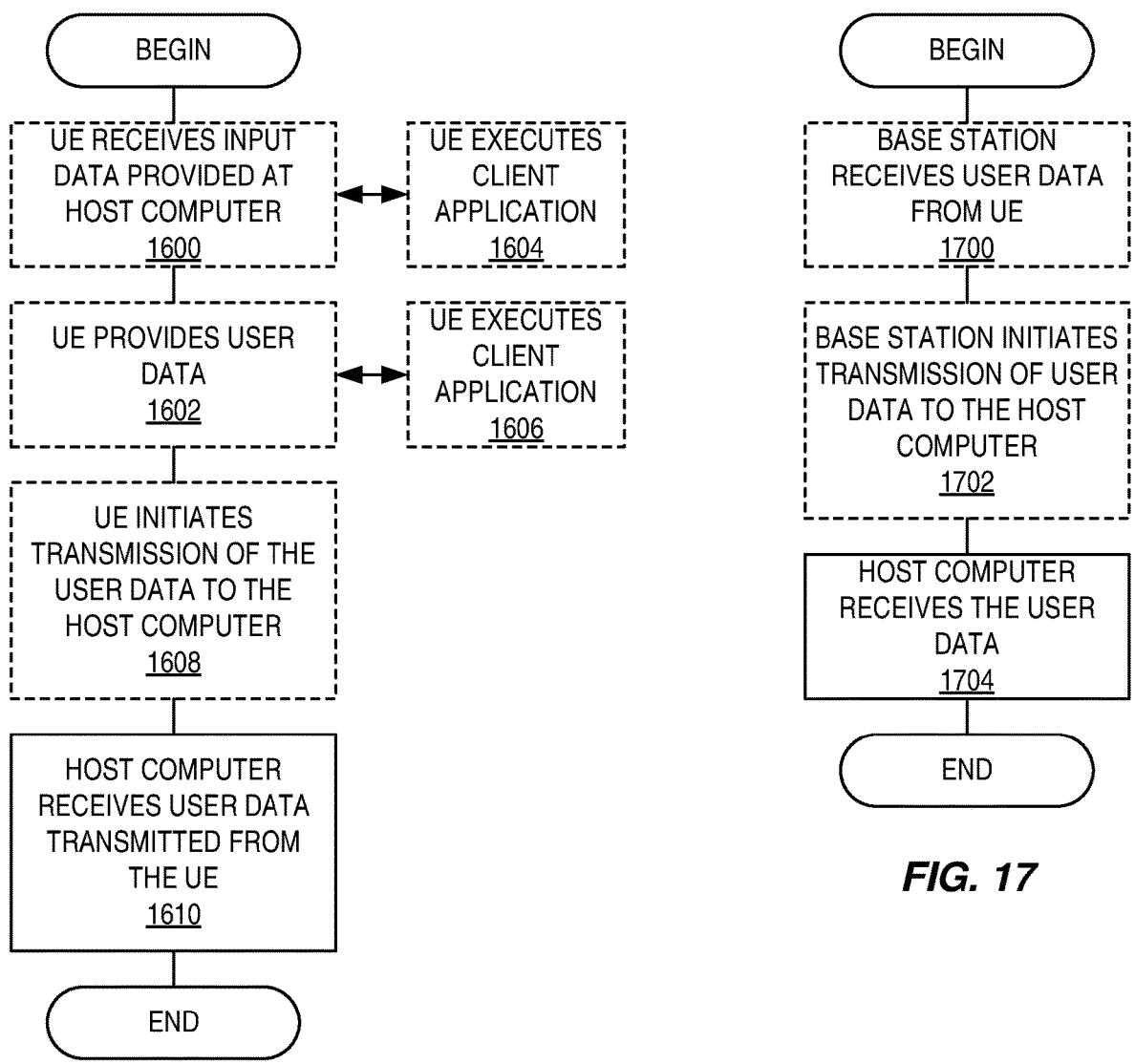

FIG. 16 is a flowchart illustrating a method implemented in a communication system, in accordance with one embodiment. The communication system includes a host computer, a base station, and a UE which may be those described with reference to FIGS. 12 and 13. For simplicity of the present disclosure, only drawing references to FIG. 16 will be included in this section. In step 1600 (which may be optional), the UE receives input data provided by the host computer. Additionally or alternatively, in step 1602, the UE provides user data. In sub-step 1604 (which may be optional) of step 1600, the UE provides the user data by executing a client application. In sub-step 1606 (which may be optional) of step 1602, the UE executes a client application which provides the user data in reaction to the received input data provided by the host computer. In providing the user data, the executed client application may further consider user input received from the user. Regardless of the specific manner in which the user data was provided, the UE initiates, in sub-step 1608 (which may be optional), transmission of the user data to the host computer. In step 1610 of the method, the host computer receives the user data transmitted from the UE, in accordance with the teachings of the embodiments described throughout this disclosure.

FIG. 17 is a flowchart illustrating a method implemented in a communication system, in accordance with one embodiment. The communication system includes a host computer, a base station, and a UE which may be those described with reference to FIGS. 12 and 13. For simplicity of the present disclosure, only drawing references to FIG. 17 will be included in this section. In step 1700 (which may be optional), in accordance with the teachings of the embodiments described throughout this disclosure, the base station receives user data from the UE. In step 1702 (which may be optional), the base station initiates transmission of the received user data to the host computer. In step 1704 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

Some example embodiments of the present disclosure are as follows.

Group A Embodiments

Embodiment 1: A method performed by a wireless device, the method comprising: determining (304) a set of narrowbands on which to perform measurements, the set of narrowbands on which to perform measurements being a subset of all narrowbands within a respective system bandwidth; performing (306) measurements on the set of narrowbands; and reporting (316) the measurements or information derived from the measurements to a network node.

Embodiment 2: The method of embodiment 1 wherein determining (304) the set of narrowbands on which to perform measurements comprises determining (304) the set of narrowbands on which to perform measurements during a random access procedure.

Embodiment 3: The method of embodiment 2 wherein reporting (316) the measurements or the information derived from the measurements to the network node comprises reporting (316) the measurements or the information derived from the measurements to the network node within a Msg3.

Embodiment 4: The method of embodiment 2 wherein performing (306) the measurements on the set of narrowbands comprises performing (306) the measurements on the set of narrowbands during: a first time interval prior to transmission of a random access preamble during the random access procedure; and/or a second time between a start of reception of Downlink Control Information, DCI, for a random access response at the wireless device during the random access procedure and transmission of a Msg3 by the wireless device during the random access procedure.

Embodiment 5: The method of embodiment 4 further comprising: transmitting (308) the random access preamble; receiving (312) the DCI for the random access response; receiving (314) a random access response from the network node in accordance with the DCI for the random access response; and transmitting (316) the Msg3 to the network node.

Embodiment 6: The method of embodiment 5 wherein reporting (316) the measurements or the information derived from the measurements to the network node comprises reporting (316) the measurements or the information derived from the measurements to the network node within the Msg3.

Embodiment 7: The method of any one of embodiments 2 to 6 further comprising: receiving (300) information comprising one or more possible values for a Msg2 DCI narrowband index; and receiving (302) bit vectors of different lengths, the different lengths corresponding to different values for a number of possible narrowbands in which Msg3/4 DCI may be located; wherein determining (304) the set of narrowbands on which to perform the measurements comprises:
  selecting one of the bit vectors having a length that corresponds to a number of possible narrowbands in which the Msg3/4 DCI may be located for a particular configuration of the wireless device; and
  determining the set of narrowbands on which to perform the measurements as a function of:
    the selected bit vector;
    the one or more possible values for the Msg2 DCI narrowband index; and
    a number of narrowbands within the system bandwidth.

Embodiment 8: The method of any one of embodiments 2 to 6 further comprising: receiving (300) information comprising one or more possible values for a Msg2 DCI narrowband index; and receiving (302) bit vectors of different lengths, the different lengths corresponding to different values for a number of possible narrowbands in which Msg3/4 DCI may be located; wherein determining (304) the set of narrowbands on which to perform the measurements comprises:
  selecting one of the bit vectors having a length that corresponds to a number of possible narrowbands in which the Msg3/4 DCI may be located for a particular configuration of the wireless device;
  initializing the set of narrowbands as a null set; and
  for each possible value $NB_{RAR}^{(j)}$ for the Msg2 DCI narrowband index:
    for each bit $b_i$ of the selected bit vector:
      If $b_i=1$, adding the narrowband with index $(NB_{RAR}^{(j)}+i)$ mod $N_{NB2}$ in the set of narrowbands S if not already present, where $N_{NB2}$ is the number of narrowbands in the system bandwidth.

Embodiment 9: The method of any one of embodiments 1 to 8 wherein reporting (316) the measurements or the information derived from the measurements to the network node comprises reporting (316) a combination of the measurements.

Embodiment 10: The method of embodiment 9 wherein the combination of the measurements is an average or weighted average of the measurements.

Embodiment 11: The method of any one of embodiments 1 to 10 wherein the wireless device is a bandwidth limited or coverage enhanced User Equipment, UE.

Embodiment 12: The method of any one of embodiments 1 to 10 wherein the wireless device is a Machine Type Communication, MTC, User Equipment, UE.

Embodiment 13: The method of any one of embodiments 1 to 10 wherein the wireless device is only required to monitor one narrowband, rather than the entire system bandwidth.

Embodiment 14: A method performed by a wireless device, the method comprising: performing (602) measurements on different narrowbands within a respective system bandwidth during different time intervals; combining (604) at least some of the measurements to provide a combined measurement; and reporting (606) the combined measurement to a network node.

Embodiment 15: The method of embodiment 14 wherein reporting (606) the combined measurement comprises reporting (606) the combined measurement as part of a Msg3 transmission during a random access procedure.

Embodiment 16: The method of embodiment 14 wherein performing (602) the measurements comprises: performing measurements on a first set of narrowbands during a first time interval; and performing measurements on a second set of narrowbands during a second time interval, wherein the second set of narrowbands is different than the first set of narrowbands and the second time interval is subsequent to the first time interval.

Embodiment 17: The method of embodiment 16 wherein the first time interval is a time interval prior to transmission of a random access preamble by the wireless device during a random access procedure.

Embodiment 18: The method of embodiment 17 wherein the second time interval is a time interval between a start of reception of Downlink Control Information, DCI, for a random access response during the random access procedure and transmission of a Msg3 during the random access procedure.

Embodiment 19: The method of embodiment 17 or 18 wherein reporting (606) the combined measurement comprises reporting (606) the combined measurement as part of a Msg3 transmission during a random access procedure.

Embodiment 20: The method of any one of embodiments 14 to 19 wherein combining (604) the at least some of the measurements comprises computing an average or weighted average of the at least some of the measurements.

Embodiment 21: The method of any one of embodiments 14 to 20 further comprising providing (606) an indication to the network node that the combined measurement is a combined measurement.

Embodiment 22: The method of any one of embodiments 14 to 21 further comprising providing (606), to the network node, information that indicates one or more parameters utilized by the wireless device to combine the at least some of the measurements.

Embodiment 23: The method of any of the previous embodiments, further comprising: providing user data; and forwarding the user data to a host computer via the transmission to the base station.

Group B Embodiments

Embodiment 24: A method performed by a base station, the method comprising: determining (310, 406) a set of narrowbands to which to constrain transmission of Msg3/4 Downlink Control Information, DCI, to a particular wireless device during a random access procedure, the set of narrowbands being a subset of all narrowbands within a respective system bandwidth; scheduling (418) Msg3/4 DCI for transmission to the wireless device during the random access procedure, in accordance with a constraint on transmission of the Msg3/4 DCI to the set of narrowbands; and transmitting (420) the Msg3/4 DCI as scheduled.

Embodiment 25: The method of embodiment 24 further comprising receiving (416), from the particular wireless device during the random access procedure, a Msg3 comprising a report of measurements on the set of narrowbands or information derived from the measurements on the set of narrowbands.

Embodiment 26: The method of embodiment 24 or 25 further comprising: transmitting (300, 400) information comprising one or more possible values for a Msg2 DCI narrowband index; and transmitting (302, 402) bit vectors of different lengths, the different lengths corresponding to different values for a number of possible narrowbands in which the Msg3/4 DCI may be located; wherein determining (310, 406) the set of narrowbands comprises:
  selecting one of the bit vectors having a length that corresponds to a number of possible narrowbands in which the Msg3/4 DCI may be located for a particular configuration of the wireless device; and
  determining the set of narrowbands as a function of:
    the selected bit vector;
    one of the one or more possible values for the Msg2 DCI narrowband index; and
    a number of narrowbands within the system bandwidth.

Embodiment 27: The method of embodiment 26 wherein the one of the one or more possible values is either only one value comprised in the information transmitted by the base station or one of the one or more possible values that corresponds to a narrowband in which the Msg2 DCI is scheduled for transmission to the wireless device.

Embodiment 28: The method of embodiment 24 or 25 further comprising: transmitting (300, 400) information comprising one or more possible values for a Msg2 DCI narrowband index; and transmitting (302, 402) bit vectors of different lengths, the different lengths corresponding to different values for a number of possible narrowbands in which the Msg3/4 DCI may be located; wherein determining (310, 406) the set of narrowbands comprises:
  selecting one of the bit vectors having a length that corresponds to a number of possible narrowbands in which the Msg3/4 DCI may be located for a particular configuration of the wireless device; and
  initializing the set of narrowbands as a null set; and
  for each bit $b_i$ of the selected bit vector:
    If $b_i=1$, adding the narrowband with index $(NB_{RAR}+i)$ mod $N_{NB2}$ in the set of narrowbands, where:
      $N_{NB2}$ is a number of narrowbands in the system bandwidth; and
      $NB_{RAR}$ is one of the one or more possible values for the Msg2 DCI narrowband index.

Embodiment 29: The method of embodiment 28 wherein the one of the one or more possible values is either only one value comprised in the information transmitted by the base station or one of the one or more possible values that corresponds to a narrowband in which the Msg2 DCI is scheduled for transmission to the wireless device.

Embodiment 30: A method performed by a base station, the method comprising: receiving (606), from a wireless device, a combined measurement, the combined measurement being a combination of measurements on different narrowbands within a respective system bandwidth during different time intervals; and utilizing (608) the combined measurement.

Embodiment 31: The method of embodiment 30 wherein receiving (606) the combined measurement comprises receiving (606) the combined measurement as part of a Msg3 transmission during a random access procedure.

Embodiment 32: The method of embodiment 30 wherein the combination of measurements comprises the combination of: measurements on a first set of narrowbands during a first time interval; and measurements on a second set of narrowbands during a second time interval, wherein the second set of narrowbands is different than the first set of narrowbands and the second time interval is subsequent to the first time interval.

Embodiment 33: The method of embodiment 32 wherein the first time interval is a time interval prior to transmission of a random access preamble by the wireless device during a random access procedure.

Embodiment 34: The method of embodiment 33 wherein the second time interval is a time interval between a start of reception of Downlink Control Information, DCI, for a random access response during the random access procedure and transmission of a Msg3 during the random access procedure.

Embodiment 35: The method of embodiment 32 or 33 wherein receiving (606) the combined measurement comprises receiving (606) the combined measurement as part of a Msg3 transmission during a random access procedure.

Embodiment 36: The method of any one of embodiments 30 to 35 wherein the combined measurement is an average or weighted average of the combined measurements.

Embodiment 37: The method of any one of embodiments 30 to 36 further comprising receiving an indication from the wireless device that the combined measurement is a combined measurement.

Embodiment 38: The method of any one of embodiments 30 to 37 further comprising receiving, from the wireless device, information that indicates one or more parameters utilized by the wireless device to combine the measurements.

Embodiment 39: The method of any of the previous embodiments, further comprising: obtaining user data; and forwarding the user data to a host computer or a wireless device.

Group C Embodiments

Embodiment 40: A wireless device, the wireless device comprising: processing circuitry configured to perform any of the steps of any of the Group A embodiments; and power supply circuitry configured to supply power to the wireless device.

Embodiment 41: A base station, the base station comprising: processing circuitry configured to perform any of the steps of any of the Group B embodiments; and power supply circuitry configured to supply power to the base station.

Embodiment 42: A User Equipment, UE, comprising: an antenna configured to send and receive wireless signals; radio front-end circuitry connected to the antenna and to processing circuitry, and configured to condition signals communicated between the antenna and the processing circuitry; the processing circuitry being configured to perform any of the steps of any of the Group A embodiments; an input interface connected to the processing circuitry and configured to allow input of information into the UE to be processed by the processing circuitry; an output interface connected to the processing circuitry and configured to output information from the UE that has been processed by the processing circuitry; and a battery connected to the processing circuitry and configured to supply power to the UE.

Embodiment 43: A communication system including a host computer comprising: processing circuitry configured to provide user data; and a communication interface configured to forward the user data to a cellular network for transmission to a User Equipment, UE; wherein the cellular network comprises a base station having a radio interface and processing circuitry, the base station's processing circuitry configured to perform any of the steps of any of the Group B embodiments.

Embodiment 44: The communication system of the previous embodiment further including the base station.

Embodiment 45: The communication system of the previous 2 embodiments, further including the UE, wherein the UE is configured to communicate with the base station.

Embodiment 46: The communication system of the previous 3 embodiments, wherein: the processing circuitry of the host computer is configured to execute a host application, thereby providing the user data; and the UE comprises processing circuitry configured to execute a client application associated with the host application.

Embodiment 47: A method implemented in a communication system including a host computer, a base station, and a User Equipment, UE, the method comprising: at the host computer, providing user data; and at the host computer, initiating a transmission carrying the user data to the UE via a cellular network comprising the base station, wherein the base station performs any of the steps of any of the Group B embodiments.

Embodiment 48: The method of the previous embodiment, further comprising, at the base station, transmitting the user data.

Embodiment 49: The method of the previous 2 embodiments, wherein the user data is provided at the host computer by executing a host application, the method further comprising, at the UE, executing a client application associated with the host application.

Embodiment 50: A User Equipment, UE, configured to communicate with a base station, the UE comprising a radio interface and processing circuitry configured to perform the method of the previous 3 embodiments.

Embodiment 51: A communication system including a host computer comprising: processing circuitry configured to provide user data; and a communication interface configured to forward user data to a cellular network for transmission to a User Equipment, UE; wherein the UE comprises a radio interface and processing circuitry, the UE's components configured to perform any of the steps of any of the Group A embodiments.

Embodiment 52: The communication system of the previous embodiment, wherein the cellular network further includes a base station configured to communicate with the UE.

Embodiment 53: The communication system of the previous 2 embodiments, wherein: the processing circuitry of the host computer is configured to execute a host application, thereby providing the user data; and the UE's processing circuitry is configured to execute a client application associated with the host application.

Embodiment 54: A method implemented in a communication system including a host computer, a base station, and a User Equipment, UE, the method comprising: at the host computer, providing user data; and at the host computer, initiating a transmission carrying the user data to the UE via a cellular network comprising the base station, wherein the UE performs any of the steps of any of the Group A embodiments.

Embodiment 55: The method of the previous embodiment, further comprising at the UE, receiving the user data from the base station.

Embodiment 56: A communication system including a host computer comprising: communication interface configured to receive user data originating from a transmission from a User Equipment, UE, to a base station; wherein the UE comprises a radio interface and processing circuitry, the UE's processing circuitry configured to perform any of the steps of any of the Group A embodiments.

Embodiment 57: The communication system of the previous embodiment, further including the UE.

Embodiment 58: The communication system of the previous 2 embodiments, further including the base station, wherein the base station comprises a radio interface configured to communicate with the UE and a communication interface configured to forward to the host computer the user data carried by a transmission from the UE to the base station.

Embodiment 59: The communication system of the previous 3 embodiments, wherein: the processing circuitry of the host computer is configured to execute a host application; and the UE's processing circuitry is configured to execute a client application associated with the host application, thereby providing the user data.

Embodiment 60: The communication system of the previous 4 embodiments, wherein: the processing circuitry of the host computer is configured to execute a host application, thereby providing request data; and the UE's processing circuitry is configured to execute a client application associated with the host application, thereby providing the user data in response to the request data.

Embodiment 61: A method implemented in a communication system including a host computer, a base station, and a User Equipment, UE, the method comprising: at the host computer, receiving user data transmitted to the base station from the UE, wherein the UE performs any of the steps of any of the Group A embodiments.

Embodiment 62: The method of the previous embodiment, further comprising, at the UE, providing the user data to the base station.

Embodiment 63: The method of the previous 2 embodiments, further comprising: at the UE, executing a client application, thereby providing the user data to be transmitted; and at the host computer, executing a host application associated with the client application.

Embodiment 64: The method of the previous 3 embodiments, further comprising: at the UE, executing a client application; and at the UE, receiving input data to the client application, the input data being provided at the host computer by executing a host application associated with the client application; wherein the user data to be transmitted is provided by the client application in response to the input data.

Embodiment 65: A communication system including a host computer comprising a communication interface configured to receive user data originating from a transmission from a User Equipment, UE, to a base station, wherein the base station comprises a radio interface and processing circuitry, the base station's processing circuitry configured to perform any of the steps of any of the Group B embodiments.

Embodiment 66: The communication system of the previous embodiment further including the base station.

Embodiment 67: The communication system of the previous 2 embodiments, further including the UE, wherein the UE is configured to communicate with the base station.

Embodiment 68: The communication system of the previous 3 embodiments, wherein: the processing circuitry of the host computer is configured to execute a host application; and the UE is configured to execute a client application associated with the host application, thereby providing the user data to be received by the host computer.

Embodiment 69: A method implemented in a communication system including a host computer, a base station, and a User Equipment, UE, the method comprising: at the host computer, receiving, from the base station, user data originating from a transmission which the base station has received from the UE, wherein the UE performs any of the steps of any of the Group A embodiments.

Embodiment 70: The method of the previous embodiment, further comprising at the base station, receiving the user data from the UE.

Embodiment 71: The method of the previous 2 embodiments, further comprising at the base station, initiating a transmission of the received user data to the host computer.

At least some of the following abbreviations may be used in this disclosure. If there is an inconsistency between abbreviations, preference should be given to how it is used above. If listed multiple times below, the first listing should be preferred over any subsequent listing(s).

3GPP Third Generation Partnership Project
5G Fifth Generation
5GC Fifth Generation Core
5GS Fifth Generation System
AP Access Point
ASIC Application Specific Integrated Circuit
BL Bandwidth Limited
BLER Block Error Rate
CE Coverage Enhancement
CPU Central Processing Unit
CRS Cell-Specific Reference Signal
CSS Common Search Space
dBm Decibel-Milliwatt
DCI Downlink Control Information
DL Downlink
DSP Digital Signal Processor
EDT Early Data Transmission
eMTC Enhanced Machine Type Communication
eNB Enhanced or Evolved Node B
EPC Evolved Packet Core
EPS Evolved Packet System
E-UTRAN Evolved Universal Terrestrial Radio Access Network
FPGA Field Programmable Gate Array
gNB New Radio Base Station
LTE Long Term Evolution
LTE-M Long Term Evolution Machine Type Communication
MAC Medium Access Control
MHz Megahertz
MME Mobility Management Entity
MPDCCH Machine Type Communication Physical Downlink Control Channel
ms Millisecond
Msg1 Message 1
Msg2 Message 2
Msg3 Message 3
Msg4 Message 4
MT Mobile-Terminated
MTC Machine Type Communication
NB-IoT Narrowband Internet of Things
NG-RAN Next Generation Radio Access Network
NPDCCH Narrowband Internet of Things Physical Downlink Control Channel
NR New Radio
NW Network
OTT Over-the-Top
PDSCH Physical Downlink Shared Channel
PDU Protocol Data Unit
P-GW Packet Data Network Gateway
PRACH Physical Random Access Channel
PRB Physical Resource Block
RA Random Access
RAM Random Access Memory
RAN Radio Access Network
RAR Random Access Response
Rel Release
ROM Read Only Memory
RRC Radio Resource Control
RRH Remote Radio Head
RSRP Reference Signal Received Power
RSRQ Reference Signal Received Quality
SCEF Service Capability Exposure Function
SI System Information
SIB System Information Block
SINR Signal to Interference plus Noise Ratio
TS Technical Specification
UE User Equipment
UL Uplink
USS User Equipment Specific Search Space
WID Work Item Description Those skilled in the art will recognize improvements and modifications to the embodiments of the present disclosure. All such improvements and modifications are considered within the scope of the concepts disclosed herein.

REFERENCES

[1] R2-1818633, RAN2 agreements for Rel-16 additional enhancements for NB-IoT and MTC, Spokane, US, November 2018
[2] 3GPP TS 36.321, Medium Access Control (MAC) Protocol Specification", v15.0.0
[3] 3GPP TS 36.133, Requirements for support of radio resource management, v15.4.0
[4] 3GPP TS 36.213

What is claimed is:

1. A method performed by a wireless device, the method comprising:
   determining a set of narrowbands on which to perform measurements, the set of narrowbands on which to perform measurements being a subset of all narrowbands within a respective system bandwidth;
   performing measurements on the set of narrowbands during one or more time periods associated with a random access procedure;
   reporting the measurements or information derived from the measurements to a base station within a message sent from the wireless device to the base station during the random access procedure, reporting the measurements or the information derived from the measurements to the base station comprising reporting a combination of the measurements performed on different narrowbands within the set of narrowbands performed during different time intervals, the combination of the measurements being an average or weighted average of the measurements;
   receiving information comprising one or more possible values for a Message 2, Msg2, Downlink Control Information, DCI, narrowband index; and
   receiving bit vectors of different lengths, the different lengths corresponding to different values for a number of possible narrowbands in which Message 3 and 4, Msg3/4, DCI may be located;
   determining the set of narrowbands on which to perform the measurements comprising:
      selecting one of the bit vectors having a length that corresponds to a number of possible narrowbands in which the Msg3/4 DCI may be located for a particular configuration of the wireless device; and
      determining the set of narrowbands on which to perform the measurements as a function of:
         selected bit vector;
         the one or more possible values for the Msg2 DCI narrowband index; and
         a number of narrowbands within the respective system bandwidth.

2. The method of claim 1, wherein the set of narrowbands on which to perform measurements is a subset of all narrowbands on which Message 3, Msg3, or Message 4, Msg4, can be scheduled for the wireless device during the random access procedure, the subset being less than all narrowbands on which Msg3 or Msg4 can be scheduled for the wireless device during the random access procedure.

3. The method of claim 2, wherein the message sent from the wireless device to the base station during the random access procedure is a Msg3.

4. The method of claim 2, further comprising, during the random access procedure:
   transmitting a random access preamble;
   receiving Downlink Control Information, DCI, for a random access response;
   receiving the random access response from the base station in accordance with the DCI for the random access response; and
   transmitting a Msg3 to the base station.

5. The method of claim 4, wherein reporting the measurements or the information derived from the measurements to the base station comprises reporting the measurements or the information derived from the measurements to the base station within the Msg.3.

6. The method of claim 2, wherein the set of narrowbands on which to perform measurements comprises:
   a) one or more narrowbands required for blind decoding of a wireless device specific search space;
   b) one or more narrowbands required for blind decoding of a common search space;
   c) both (a) and (b);
   d) one or more narrowbands in which the wireless device is to monitor for paging;
   e) both (a) and (d);
   f) both (b) and (d); or
   g) both (c) and (d).

7. The method of claim 1, wherein performing the measurements on the set of narrowbands comprises performing the measurements on the set of narrowbands during:
   first time interval prior to transmission of a random access preamble during the random access procedure;
   a second time interval between a start of reception of Downlink Control Information, DCI, for a random access response at the wireless device during the random access procedure and transmission of a Message 3, Msg3, by the wireless device during the random access procedure; or
   both the first time interval and the second time interval.

8. The method of claim 1, further comprising deriving, based on the measurement, a number of repetitions needed for each narrowband in the set of narrowbands.

9. The method of claim 8, further comprising reporting the number of repetitions needed for each narrowband in the set of narrowbands to the base station.

10. The method of claim 8, further comprising reporting an average of the number of repetitions needed for each narrowband in the set of narrowbands to the base station.

11. The method of claim 1, wherein the wireless device is:
    a bandwidth limited or coverage enhanced User Equipment, UE;
    a Machine Type Communication, MTC, UE; or
    a wireless device that is only required to monitor one narrowband, rather than the entire system bandwidth.

12. A wireless device, comprising:
    one or more transmitters;
    one or more receivers; and
    processing circuitry associated with the one or more transmitters and the one or more receivers, the processing circuitry configured to cause the wireless device to:
       determine a set of narrowbands on which to perform measurements, the set of narrowbands on which to perform measurements being a subset of all narrowbands within a respective system bandwidth;
       perform measurements on the set of narrowbands during one or more time periods associated with a random access procedure; and
       report the measurements or information derived from the measurements to a base station within a message sent from the wireless device to the base station during the random access procedure, reporting the measurements or the information derived from the measurements to the base station comprising reporting a combination of the measurements performed on different narrowbands within the set of narrowbands performed during different time intervals, the combination of the measurements being an average or weighted average of the measurements;
       receive information comprising one or more possible values for a Message 2, Msg2, Downlink Control Information, DCI, narrowband index; and receive bit vectors of different lengths, the different lengths corresponding to different values for a number of possible narrowbands in which Message 3 and 4, Msg3/4, DCI may be located;

determining the set of narrowbands on which to perform the measurements comprising:

selecting one of the bit vectors having a length that corresponds to a number of possible narrowbands in which the Msg3/4 DCI may be located for a particular configuration of the wireless device;

initializing the set of narrowbands as a null set; and for each possible value $NB_{RAR}^{(j)}$ for the Msg2 DCI narrowband index:

for each bit $b_i$ of the selected bit vector:

if $b_i=1$, adding the narrowband with index $(NB_{RAR}^{(j)}+i) \bmod N_{NB2}$ in the set of narrowbands S if not already present, where $N_{NB2}$ is the number of narrowbands in the system bandwidth.

\* \* \* \* \*